(12) United States Patent
Zhao et al.

(10) Patent No.: US 11,663,235 B2
(45) Date of Patent: May 30, 2023

(54) TECHNIQUES FOR MIXED-INITIATIVE VISUALIZATION OF DATA

(71) Applicant: AUTODESK, INC., San Francisco, CA (US)

(72) Inventors: Jian Zhao, Toronto (CA); Michael Glueck, Toronto (CA); Azam Khan, Toronto (CA); Simon Breslav, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 15/441,219

(22) Filed: Feb. 23, 2017

(65) Prior Publication Data
US 2018/0081862 A1 Mar. 22, 2018

Related U.S. Application Data
(60) Provisional application No. 62/398,433, filed on Sep. 22, 2016.

(51) Int. Cl.
*G06F 16/26* (2019.01)
*G06T 11/20* (2006.01)
*G06F 40/169* (2020.01)
*G06F 16/35* (2019.01)
*G06F 40/106* (2020.01)

(52) U.S. Cl.
CPC ............ *G06F 16/26* (2019.01); *G06F 16/358* (2019.01); *G06F 40/106* (2020.01); *G06F 40/169* (2020.01); *G06T 11/206* (2013.01)

(58) Field of Classification Search
CPC .............. G06F 17/212; G06F 17/241; G06F 17/30592; G06F 17/30958; G06F 16/26; G06F 40/106; G06F 40/169
See application file for complete search history.

(56) References Cited

U.S. PATENT DOCUMENTS 5,786,810 A 7/1998 Knox et al.
5,786,814 A 7/1998 Moran et al.
(Continued)

OTHER PUBLICATIONS

Landesberger et al., Mobility Graphs—Visual Analysis of Mass Mobility Dynamics via Spatio-Temporal Graphs and Clustering, Oct. 25, 2015, IEEE Transactions on Visualization and Computer Graphics, vol. 22, No. 1, Jan. 2016, pp. 11-20.*
(Continued)

*Primary Examiner* — Scott T Baderman
*Assistant Examiner* — Seung Woon Jung
(74) *Attorney, Agent, or Firm* — Artegis Law Group, LLP

(57) ABSTRACT

In various embodiments, a visualization engine generates graphs that facilitate sense making operations on data sets. A graph includes nodes that are associated with a data set and edges that represent relationships between the nodes. In operation, the visualization engine computes pairwise similarities between the nodes. Subsequently, the visualization engine computes a layout for the graph based on the pairwise similarities and user-specified constraints. Finally, the visualization engine renders a graph for display based on the layout, the nodes, and the edges. Advantageously, by interactively specifying constraints and then inspecting the topology of the automatically generated graph, the user may efficiently explore salient aspects of the data set.

20 Claims, 8 Drawing Sheets

FIG. 3A  FIG. 3B  FIG. 3C

(56) References Cited

U.S. PATENT DOCUMENTS

| | | | |
|---|---|---|---|
| 7,630,867 B2 | 12/2009 | Behrens et al. | |
| 8,533,593 B2 | 9/2013 | Grossman et al. | |
| 8,701,002 B2 | 4/2014 | Grossman et al. | |
| 9,146,657 B2 | 9/2015 | Beckett et al. | |
| 9,183,281 B2 | 11/2015 | Cheng et al. | |
| 9,786,074 B2 | 10/2017 | Beckett et al. | |
| 9,836,183 B1* | 12/2017 | Love | G06F 3/04817 |
| 10,055,486 B1* | 8/2018 | Xu | G06F 16/5866 |
| 10,061,756 B2 | 8/2018 | Gunawardena et al. | |
| 10,565,225 B2 | 2/2020 | Ross | |
| 10,635,854 B2 | 4/2020 | Hosokawa et al. | |
| 11,017,162 B2 | 5/2021 | Ono et al. | |
| 2003/0225926 A1 | 12/2003 | Nosek | |
| 2004/0090472 A1* | 5/2004 | Risch | G06F 16/34 715/853 |
| 2004/0103091 A1* | 5/2004 | Lindblad | G06F 16/83 |
| 2004/0267798 A1 | 12/2004 | Chatterjee et al. | |
| 2006/0047697 A1* | 3/2006 | Conway | G16B 50/00 |
| 2006/0236219 A1 | 10/2006 | Grigorovitch et al. | |
| 2007/0239405 A1 | 10/2007 | Behrens et al. | |
| 2009/0265330 A1 | 10/2009 | Cheng et al. | |
| 2011/0218820 A1 | 9/2011 | Himes et al. | |
| 2011/0219325 A1 | 9/2011 | Himes et al. | |
| 2012/0272153 A1 | 10/2012 | Grossman et al. | |
| 2012/0272173 A1 | 10/2012 | Grossman et al. | |
| 2013/0073995 A1 | 3/2013 | Piantino et al. | |
| 2013/0185657 A1 | 7/2013 | Gunawardena et al. | |
| 2014/0047312 A1 | 2/2014 | Ruble et al. | |
| 2014/0059468 A1 | 2/2014 | Allgair | |
| 2014/0255898 A1 | 9/2014 | Burge et al. | |
| 2014/0310623 A1 | 10/2014 | O'Connell, Jr. et al. | |
| 2014/0344191 A1 | 11/2014 | Lebow | |
| 2015/0089366 A1 | 3/2015 | Beckett et al. | |
| 2015/0347576 A1* | 12/2015 | Endert | G06F 17/30719 707/724 |
| 2016/0027197 A1 | 1/2016 | Beckett et al. | |
| 2016/0378721 A1 | 12/2016 | Jarroush | |
| 2016/0378734 A1 | 12/2016 | Mullins et al. | |
| 2017/0083497 A1 | 3/2017 | Hosokawa et al. | |
| 2017/0109335 A1 | 4/2017 | Lee et al. | |
| 2017/0201851 A1* | 7/2017 | Huang | G06F 17/30303 |
| 2017/0235848 A1* | 8/2017 | Van Dusen | G06N 20/00 705/12 |
| 2017/0255686 A1 | 9/2017 | Ross | |
| 2017/0278016 A1* | 9/2017 | Jiang | G06N 20/00 |
| 2018/0081862 A1 | 3/2018 | Zhao et al. | |
| 2018/0123995 A1 | 5/2018 | Xue et al. | |
| 2018/0137155 A1* | 5/2018 | Majumdar | G06F 16/28 |
| 2018/0176661 A1 | 6/2018 | Varndell et al. | |
| 2020/0142902 A1 | 5/2020 | Ross | |
| 2020/0175099 A1 | 6/2020 | Ono et al. | |
| 2021/0216703 A1 | 7/2021 | Ono et al. | |

OTHER PUBLICATIONS

Wartena et al., Using Tag Co-occurrence for Recommendation, Dec. 28, 2009, Intelligent Systems Design and Applications, 2009. ISDA '09, pp. 273-278.*

Breslav et al., Exploratory Sequential Data Analysis for Multi-Agent Occupancy Simulation Results, published at SimAUD 2015, Apr. 12-15, 2015, p. 8 (Year: 2015).*

D. Billman, G. Convertino, J. Shrager, J. P. Massar, and P. Pirolli. Collaborative intelligence analysis with cache and its effects on information gathering and cognitive bias. In Human Computer Interaction Consortium Workshop, 2006.

M. Brehmer and T. Munzner. A multi-level typology of abstract visualization tasks. IEEE Trans. on Visualization and Computer Graphics, 19(12):2376-2385, 2013. doi: 10.1109/TVCG.2013.124.

S. Breslav, R. Goldstein, A. Khan, and K. Hornbaek. Exploratory sequential data analysis for multi-agent occupancy simulation results. In Proc. Symposium on Simulation for Architecture & Urban Design, pp. 59-66, 2015.

S. Breslav, A. Khan, and K. Hornbaek. Mimic: Visual analytics of online micro-interactions. In Proc. the International Working Conference on Advanced Visual Interfaces, pp. 245-252, 2014. doi: 10.1145/2598153. 2598168.

T. Chklovski, V. Ratnakar, and Y. Gil. User interfaces with semi-formal representations: a study of designing argumentation structures. In Proc. ACM conference on the Intelligent User Interfaces Conference, pp. 130-136, 2005.

W. Dou, D. H. Jeong, F. Stukes, W. Ribarsky, H. R. Lipford, and R. Chang. Recovering reasoning processes from user interactions. IEEE Computer Graphics and Applications, 29(3):52-61, 2009. doi: 10. 1109/MCG.2009.49.

M. Elias and A. Bezerianos. Annotating BI visualization dashboards: Needs & challenges. In Proc. SIGCHI Conference on Human Factors in Computing Systems, pp. 1641-1650, 2012. doi: 10.1145/2207676. 2208288.

D. Gotz and M. X. Zhou. Characterizing users' visual analytic activity for insight provenance. In Proc. IEEE Symposium on Visual Analytics Science and Technology, pp. 123-130, 2008. doi: 10.1109/VAST.2008.4677365.

J. Heer and B. Shneiderman. Interactive dynamics for visual analysis. Communications of ACM, 55(4):45-54, 2012. doi: 10.1145/2133806. 2133821.

T. J. Jankun-Kelly. Using visualization process graphs to improve visualization exploration. In J. Freire, D. Koop, and L. Moreau, eds., Provenance and Annotation of Data and Processes, pp. 78-91. Springer Berlin Heidelberg, 2008. doi 10.1007/978-3-540-89965-5 10.

N. Mahyar and M. Tory. Supporting communication and coordination in collaborative sensemaking. IEEE Trans. on Visualization and Computer Graphics, 20(12):1633-1642, 2014. doi: 10.1109/TVCG. 2014.2346573.

J. Pennington, R. Socher, and C. D. Manning. GloVe: Global vectors for word representation. In Proc. Empirical Methods in Natural Language Processing, pp. 1532-1543, 2014.

P. Pirolli and S. Card. The sensemaking process and leverage points for analyst technology as identified through cognitive task analysis. In Proc. International Conference on Intelligence Analysis, vol. 5, pp. 2-4, 2005.

P. M. Sanderson and C. Fisher. Exploratory sequential data analysis: Foundations. Human-Computer Interaction, 9(4):251-317, 1994. doi: 10. 1207/s15327051hci0903&4 2.

Y. B. Shrinivasan, D. Gotz, and J. Lu. Connecting the dots in visual analysis. In Proc. IEEE Symposium on Visual Analytics Science and Technology, pp. 123-130, 2009. doi: 10.1109/VAST.2009.5333023.

Y. B. Shrinivasan and J. J. van Wijk. Supporting the analytical reasoning process in information visualization. In Proc. SIGCHI Conference on Human Factors in Computing Systems, pp. 1237-1246, 2008. doi: 10. 1145/1357054.1357247.

W. Willett, J. Heer, J. Hellerstein, and M. Agrawala. CommentSpace: Structured support for collaborative visual analysis. In Proc. SIGCHI Conference on Human Factors in Computing Systems, pp. 3131-3140.

J. Zhao, D. Wigdor, and R. Balakrishnan. TrailMap: Facilitating information seeking in a multi-scale digital map via implicit bookmarking. In Proc. SIGCHI Conference on Human Factors in Computing Systems, pp. 3009-3018, 2013. doi: 10.1145/2470654.2481417.

Kang et al., "Evaluating Visual Analytics System for Investigative Analysis: Deriving Design Principles from a case study", School of Interactive Computing & GVU Center, Georgia Institute of Technology, Proc. IEEE Symposium on Visual Analytics Science and Technology, pp. 139-146, 2009. doi: 10.1109/VAST.2009.5333878.

Alexander et al., "Revisiting Read Wear: Analysis, Design, and Evaluation of a Footprints Scrollbar", In Proceedings of the Conference on Human Factors in Computing Systems (CHI), doi:10. 1145/1518701.1518957, ACM, Apr. 8, 2009, pp. 1665-1674.

Badam et al., "Polychrome: A Cross-Device Framework for Collaborative Web Visualization", In Proceedings of the International Conference on Interactive Tabletops and Surfaces (ITS), doi:10. 1145/2669485.2669518, ACM,Nov. 16-19, 2014, pp. 109-118.

(56) References Cited

OTHER PUBLICATIONS

Bier et al., "Principles and Tools for Collaborative Entity-Based Intelligence Analysis", IEEE Transactions on Visualization and Computer Graphics, vol. 16, No. 2, doi: 10.1109/TVCG.2009.104, Mar./Apr. 2010, pp. 178-191.
Callahan et al., "VisTrails: Visualization meets Data Management", In Proceedings of the 2006 ACM SIGMOD International Conference on Management of Data, doi:10.1145/1142473.1142574, Jun. 27-29, 2006, pp. 745-747.
Chang et al., "WireVis: Visualization of Categorical, Time-Varying Data from Financial Transactions", In IEEE Symposium on Visual Analytics Science and Technology, doi: 10.1109/VAST.2007.4389009, Oct. 30-Nov. 1, 2007, pp. 155-162.
Chen et al., "Supporting Effective Common Ground Construction in Asynchronous Collaborative Visual Analytics", In Proceedings of the Symposium on Visual Analytics Science and Technology (VAST), doi:10.1109/VAST.2011.6102447, IEEE, Oct. 23-28, 2011, pp. 101-110.
Chung et al., "VizCept: Supporting Synchronous Collaboration for Constructing Visualizations in Intelligence Analysis", In Proceedings of the Symposium on Visual Analytics Science and Technology (VAST), doi:10.1109/VAST.2010.5652932, IEEE, Oct. 24-29, 2010, pp. 107-114.
Dou et al., "Recovering Reasoning Processes from User Interactions", IEEE Computer Graphics and Applications, doi:10.1109/MCG.2009. 49, vol. 29, No. 3, May/Jun. 2009, pp. 52-61.
Gava et al., "The 3C Cooperation Model Applied to the Classical Requirement Analysis", Journal of Information Systems and Technology Management, doi:10.4301/s1807-17752012000200003, vol. 9, No. 2, May/Aug. 2012, pp. 235-264.
Grinstein et al., "Vast 2006 Contest—A Tale of Alderwood", In Proceedings of the Symposium on Visual Analytics Science And Technology, doi:10.1109/VAST.2006.261420, IEEE, Oct. 31-Nov. 2, 2006, pp. 215-216.
Grossman et al., "Chronicle: Capture, Exploration, and Playback of Document Workflow Histories", In Proceedings of the Symposium on User Interface Software and Technology (UIST), doi:10.1145/1866029.1866054pp, ACM, Oct. 3-6, 2010, pp. 143-152.
Hamilton et al., "Conductor: Enabling and Understanding Cross-Device Interaction", In Proceedings of the Conference on Human Factors in Computing Systems (CHI), doi:10.1145/2556288.2557170, ACM, Apr. 26-May 1, 2014, pp. 2773-2782.
Heer et al., "Design considerations for collaborative visual analytics", Information Visualization, vol. 7, No. 1, doi:10.1057/palgrave.ivs.9500167, Mar. 2008, pp. 49-62.
Heer et al., "Graphical Histories for Visualization: Supporting Analysis, Communication, and Evaluation", IEEE Transactions on Visualization and Computer Graphics, vol. 14, No. 6, doi:10.1109/TVCG.2008.137, Nov./Nov. 2008, pp. 1189-1196.
Heer et al., "Voyagers and Voyeurs: Supporting Asynchronous Collaborative Information Visualization", In Proceedings of the Conference on Human Factors in Computing Systems (CHI), doi:10.1145/1240624.1240781, ACM, Apr. 28-May 3, 2007, pp. 1029-1038.
Isenberg et al., "Interactive Tree Comparison for Co-located Collaborative Information Visualization", IEEE Transactions on Visualization and Computer Graphics, vol. 13, No. 6, doi:10.1109/TVCG.2007.70568, Nov./Dec. 2007, pp. 1232-1239.
Isenberg et al., "Collaborative visualization: Definition, challenges, and research agenda", Information Visualization, vol. 10, No. 4, doi:10.1177/1473871611412817, Oct. 2011, pp. 310-326.
Isenberg et al., "Collaborative Brushing and Linking for Co-located Visual Analytics of Document Collections", In Computer Graphics Forum, doi:10.1111/j.1467-8659.2009.01444.x, vol. 28, No. 3, Wiley Online Library, Jun. 2009, pp. 1031-1038.
Isenberg et al., "Co-Located Collaborative Visual Analytics around a Tabletop Display", IEEE Transactions on Visualization and Computer Graphics, vol. 18, No. 5, doi:10.1109/TVCG.2011.287, May 2012, pp. 689-702.
Isenberg et al., "An Exploratory Study of Visual Information Analysis", In Proceedings of the Conference on Human Factors in Computing Systems (CHI), doi:10.1145/1357054.1357245, ACM, Apr. 5-10, 2008, pp. 1217-1226.
Jakobsen et al., "Up Close and Personal: Collaborative Work on a High-Resolution Multitouch Wall Display", Transactions on Computer-Human Interaction (TOCHI), vol. 21, No. 2, Article 11, doi:10.1145/2576099, Feb. 2014, pp. 11:1-34.
Kadivar et al., "Capturing and Supporting the Analysis Process", In Proceedings of the Symposium on Visual Analytics Science and Technology (VAST), doi:10.1109/VAST.2009.5333020, IEEE, Oct. 12-13, 2009, pp. 131-138.
Kang et al., "Evaluating Visual Analytics Systems for Investigative Analysis: Deriving Design Principles from a Case Study", In Proceedings of the Symposium on Visual Analytics Science and Technology (VAST), doi:10.1109/VAST.2009.5333878, IEEE, Oct. 12-13, 2009, pp. 139-146.
Kang et al., "Characterizing the Intelligence Analysis Process: Informing Visual Analytics Design through a Longitudinal Field Study", In Visual Analytics Science and Technology (VAST), doi:10.1109/VAST.2011.61024382011, IEEE Symposium on, Oct. 23-28, 2011, pp. 21-30.
Keel, Paul E., "Collaborative Visual Analytics: Inferring from the Spatial Organization and Collaborative Use of Information", In Proceedings of the Symposium on Visual Analytics Science and Technology (VAST), doi:10.1109/VAST.2006.261415, IEEE, Oct. 31-Nov. 2, 2006, pp. 137-144.
Krzywinski et al., "Points of Significance: Error Bars", Nature Methods, vol. 10, No. 10, doi:10.1038/nmeth.2659, Oct. 2013, pp. 921-922.
Kwon et al., "Evaluating the Role of Time in Investigative Analysis of Document Collections", IEEE Transactions on Misualization and Computer Graphics, vol. 18, No. 11, doi:10.1109/TVCG.2012.89, Nov. 2012, pp. 1992-2004.
Mahyar et al., "Supporting Communication and Coordination in Collaborative Sensemaking", IEEE Transactions on Visualization and Computer Graphics, vol. 20, No. 12, doi:10.1109/TVCG.2014.2346573, Dec. 2014, pp. 1633-1642.
McGrath et al. Branch-explore-merge: facilitating real-time revision control in co-located collaborative visual exploration. In Proceedings of the Conference on Interactive Tabletops and Surfaces (ITS), doi: 10.1145/2396636.2396673 pp. 235-244. ACM, 2012.
Morris et al., "SearchTogether: An Interface for Collaborative Web Search", In Proceedings of Symposium on User Interface Software and Technology (UIST), doi:10.1145/1294211.1294215, ACM, Oct. 7-10, 2007, pp. 3-12.
Paul et al., "Understanding Together: Sensemaking in Collaborative Information Seeking", In Proceedings of Conference on Computer Supported Cooperative Work (CSCW), doi:10.1145/1718918.1718976, ACM, Feb. 6-10, 2010, pp. 321-330.
Pirolli et al., "Information Foraging", Psychological Review, doi:10.1037/0033-295X.106.4.643, vol. 106, No. 4, Oct. 1999, pp. 643-675.
Prue et al., "Overcoming Limited Collaboration Channels in Distributed Intelligence Analysis: Visualization Tools and Design Seeds", In Proceedings of the Joint Intelligence and Security Informatics Conference (JISIC), doi:10.1109/JISIC.2014.13, IEEE, 2014, pp. 17-24.
Ragan et al., "Characterizing Provenance in Visualization and Data Analysis: An Organizational Framework of Provenance Types and Purposes", IEEE Transactions on Visualization and Computer Graphics, vol. 22, No. 1, doi:10.1109/TVCG.2015.2467551, Jan. 2016, pp. 31-40.
Robinson, Anthony C., "Collaborative Synthesis of Visual Analytic Results", In Proceedings of the Symposium on Visual Analytics Science and Technology (VAST), doi:10.1109/VAST.2008.4677358, IEEE, Oct. 21-23, 2008, pp. 67-74.
Russell et al., "Sensemaking for the rest of us", In Proceedings of the ACM CHI Sensemaking Workshop, Apr. 7, 2008, 7 pages.
Russell et al., "The Cost Structure of Sensemaking", In Proceedings Conference on Human Factors in Computing Systems (CHI/INTERACT), doi:10.1145/169059.169209, ACM, Apr. 24-29, 1993, pp. 269-276.

(56) References Cited

OTHER PUBLICATIONS

Sarvghad et al., "Exploiting Analysis History to Support Collaborative Data Analysis", In Proceedings of the Graphics Interface Conference (GI), doi:10.20380/GI2015.16, Canadian Information Processing Society, Jun. 3-5, 2015, pp. 123-130.

Sarvghad et al., "Visualizing Dimension Coverage to Support Exploratory Analysis", IEEE Transactions on Visualization and Computer Graphics, vol. 23, No. 1, doi:10.1109/TVCG.2016. 2598466, Jan. 2017, pp. 21-30.

Scholtz et al., "User-Centered Design Guidelines for Collaborative Software for Intelligence Analysis", In International Conference on Collaboration Technologies and Systems (CTS), doi:10.1109/CTS. 2014.6867610, IEEE, 2014, pp. 478-482.

Sharma, Nikhil, "Sensemaking Handoff: When and how?", Proceedings of the American Society for Information Science and Technology, vol. 45, No. 1, doi:10.1002/meet.2008.1450450234, Jun. 2008, pp. 1-12.

Sharma et al., "Artifact Usefulness and Usage in Sensemaking Handoffs", Proceedings of the Association for Information Science and Technology, vol. 46, No. 1, doi:10.1002/meet.2009. 1450460219, Nov. 2009, 1-19 pages.

Stasko et al., "Jigsaw: Supporting investigative analysis through interactive visualization", Information Visualization, vol. 7, No. 2, doi:10.1057/palgrave.ivs.9500180, Jun. 2008, pp. 118-132.

Viegas et al., "Many Eyes: A Site for Visualization at Internet Scale", Transactions on Visualization and Computer Graphics, vol. 13, No. 6, doi:10.1109/TVCG.2007.70577, Nov./Dec. 2007, pp. 1121-1128.

Vogt et al., "Co-located Collaborative Sensemaking on a Large High-Resolution Display with Multiple Input Devices", In IFIP Conference on Human-Computer Interaction (INTERACT), doi:10. 1007/978-3-642-23771-3 44, Springer, 2011, pp. 589-604.

Wattenberg et al., "Designing for Social Data Analysis", Transactions on Visualization and Computer Graphics, vol. 12, No. 4, doi:10.1109/TVCG.2006.65, Jul./Aug. 2006, pp. 549-557.

Willett et al., Scented Widgets: Improving Navigation Cues with Embedded Visualizations, Transactions on Visualization and Computer Graphics, vol. 13, No. 6, doi:10.1109/TVCG.2007.70589, Nov./Dec. 2007, pp. 1129-1136.

Willett et al., "CommentSpace: Structured Support for Collaborative Visual Analysis", In Proceedings of the Conference on Human Factors in Computing Systems (CHI), doi:10.1145/1978942. 1979407, ACM, May 7-12, 2011, pp. 3131-3140.

Wright et al., "The Sandbox for Analysis: Concepts and Methods", In Proceedings of the Conference on Human Factors in Computing Systems (CHI), doi:10.1145/1124772.1124890, ACM, Apr. 22-27, 2006, pp. 801-810.

Xu et al., "Analytic Provenance for Sensemaking: A Research Agenda", IEEE Computer Graphics and Applications, vol. 35, No. 3, doi:10.1109/MCG.2015.50, May 2015, pp. 56-64.

Final Office Action for U.S. Appl. No. 15/710,776, dated Oct. 9, 2019, 17 pages.

Zhao et al., "Annotation Graphs: A Graph-Based Visualization for Meta-Analysis of Data based on User-Authored Annotations", IEEE Transactions on Visualization and Computer Graphics, vol. 23, No. 1, doi:10.1109/TVCG.2016.2598543, Jan. 2016, pp. 261-270.

Heer et al., "Voyagers and Voyeurs: Supporting Asynchronous Collaborative Visualization", Communications of the ACM, vol. 52, No. 1, Jan. 2009, pp. 87-97.

Hullman et al., "Contextifier: Automatic Generation of Annotated Stock Visualizations", Proceedings of the SIGCHI Conference on Human Factors in Computing Systems, Apr. 27-May 2, 2013, pp. 2707-2716.

Kandogan, Eser, "Just-in-time Annotation of Clusters, Outliers, and Trends in Point-based Data Visualizations", Proceedings of the IEEE Conference on Visual Analytics Science and Technology (VAST), Oct. 14-19, 2012, pp. 73-82.

Luther et al., "Pathfinder: An Online Collaboration Environment for Citizen Scientists", Proceedings of the SIGCHI Conference on Human Factors in Computing Systems, Apr. 6, 2009, pp. 239-248.

Marcus et al., "TwitInfo: Aggregating and Visualizing Microblogs for Event Exploration", Proceedings of the SIGCHI Conference on Human Factors in Computing Systems, May 7-12, 2011, pp. 227-236.

Andrews et al., "Space to Think: Large, High-Resolution Displays for Sensemaking", In Proceedings of the SIGCHI Conference on Human Factors in Computing Systems (CHI), DOI:http://dx.doi. org/10.1145/1753326.1753336, Apr. 10-15, 2010, pp. 55-64.

Billman et al., "Collaborative Intelligence Analysis with CACHE and its Effects on Information Gathering and Cognitive Bias", In Human Computer Interaction Consortium Workshop, 2006, pp. 1-35.

Blascheck et al., "VA^2: A Visual Analytics Approach for // Evaluating Visual Analytics Applications", IEEE Transactions on Visualization and Computer Graphics, vol. 22, No. 1, doi:10.1109/ TVCG.2015.2467871, Jan. 2016, pp. 61-70.

Brehmer et al., "A Multi-Level Typology of Abstract Visualization Tasks", IEEE Transactions on Visualization and Computer Graphics, vol. 19, No. 12, doi:10.1109/TVCG.2013.124, Dec. 2013, pp. 2376-2385.

Breslav, Simon, "UberTagger: Exploratory Analysis and Annotation of Sequential Data [software]", Available from https://github.com/ sbreslav/UberTagger, latest commit Dec. 2015, site accessed Nov. 2019.

Breslav et al., "Exploratory Sequential Data Analysis for Multi-Agent Occupancy Simulation Results", In Proceedings Symposium on Simulation for Architecture & Urban Design, Apr. 12-15, 2015, pp. 59-66.

Breslav et al., "Mimic: Visual Analytics of Online Micro-interactions", In Proceedings the International Working Conference on Advanced Visual Interfaces, doi:10.1145/2598153.2598168, May 27-30, 2014, pp. 245-252.

Chin et al., "Exploring the Analytical Processes of Intelligence Analysts", In Proceedings SIGCHI Conference on Human Factors in Computing Systems, doi:10.1145/1518701.1518704, Apr. 6, 2009, pp. 11-20.

Chklovski et al., "User Interfaces with Semi-Formal Representations: A Study of Designing Argumentation Structures", In Proceedings ACM conference on Intelligent User Interfaces, Jan. 9-12, 2005, pp. 130-136.

Crowe et al., "Comparing Interfaces Based on What Users Watch and Do", In Proceedings the Symposium on Eye Tracking Research & Applications, doi:10.1145/355017.355022, 2000, pp. 29-36.

Elias et al., "Annotating BI Visualization Dashboards: Needs & Challenges", In Proceedings SIGCHI Conference on Human Factors in Computing Systems, doi:10.1145/2207676.2208288, May 5-10, 2012, pp. 1641-1650.

Gotz et al., "Characterizing Users' Visual Analytic Activity for Insight Provenance", In Proceedings IEEE Symposium on Visual Analytics Science and Technology, doi:10.1109/VAST.2008. 4677365, Oct. 21-23, 2008, pp. 123-130.

Heer et al., "Interactive Dynamics for Visual Analysis", Communications of ACM, vol. 55, No. 4, doi:10.1145/2133806.2133821, Apr. 2012, pp. 45-54.

Jankun-Kelly, T.J., "Using Visualization Process Graphs to Improve Visualization Exploration", In J. Freire, D. Koop, and L. Moreau, eds., Provenance and Annotation of Data and Processes, doi:10. 1007/978-3-540-89965-510, Springer Berlin Heidelberg, 2008, pp. 78-91.

Kang et al., "Characterizing the intelligence analysis process through a longitudinal field study: Implications for visual analytics", Information Visualization, vol. 13, No. 2, doi:10.1177/1473871612468877, 2014, pp. 134-158.

Mahyar et al., "A Closer Look at Note Taking in the Co-located Collaborative Visual Analytics Process", In Proceedings IEEE Symposium on Visual Analytics Science and Technology, doi:10.1109/ VAST.2010.5652879, Oct. 24-29, 2010, pp. 171-178.

Moran et al., "Spatial Interpretation of Domain Objects Integrated into a Freeform Electronic Whiteboard", In Proceedings ACM Symposium on User Interface Software and Technology, doi:10. 1145/288392.288600, 1998, pp. 175-184.

(56) References Cited

OTHER PUBLICATIONS

Pennington et al., "GloVe: Global Vectors for Word Representation", In Proceedings Empirical Methods in Natural Language Processing, Oct. 25-29, 2014, pp. 1532-1543.

Pirolli et al., "The Sensemaking Process and Leverage Points for Analyst Technology as Identified Through Cognitive Task Analysis", In Proceedings International Conference on Intelligence Analysis, vol. 5, 2005, 6 pages.

Sanderson et al., "Exploratory Sequential Data Analysis: Foundations", Human-Computer Interaction, vol. 9, No. 4, doi:10.1207/s15327051hci0903&4_2, 1994, pp. 251-317.

Shrinivasan et al., "Connecting the Dots in Visual Analysis", In Proceedings IEEE Symposium on Visual Analytics Science and Technology, doi:10.1109/VAST.2009.5333023, Oct. 12-13, 2009, pp. 123-130.

Shrinivasan et al., "Supporting the Analytical Reasoning Process in Information Visualization", In Proceedings SIGCHI Conference on Human Factors in Computing Systems, doi:10.1145/1357054.1357247, Apr. 5-10, 2008, pp. 1237-1246.

Wattenberg, Martin, "Visual Exploration of Multivariate Graphs", In Proceedings SIGCHI conference on Human Factors in computing systems, doi:10.1145/1124772.1124891, Apr. 22-27, 2006, pp. 811-819.

Zhao et al., "TrailMap: Facilitating Information Seeking in a Multi-Scale Digital Map via Implicit Bookmarking", In Proceedings SIGCHI Conference on Human Factors in Computing Systems, doi:10.1145/2470654.2481417, Apr. 27-May 2, 2013, pp. 3009-3018.

Paul, S. A., Understanding Together: Sensemaking in Collaborative Information Seeking. PhD thesis, The Pennsylvania State University, May 2010, 267 pages.

Non-Final Office Action for U.S. Appl. No. 15/710,776, dated Feb. 6, 2020, 17 pages.

Non-Final Office Action for U.S. Appl. No. 15/710,776, dated Jun. 12, 2019, 14 pages.

Non-Final Office Action for U.S. Appl. No. 15/710,776, dated Jun. 29, 2018, 18 pages.

Final Office Action for U.S. Appl. No. 15/710,776, dated Nov. 15, 2018, 28 pages.

Vocabulary.com, "Timeline—Dictionary Definition," 2014, www.vocabulary.com, https://web.archive.org/web/20140428034119/https://www.vocabulary.com/dictionary/timeline, pp. 1-2. (Year: 2014).

Final Office Action for U.S. Appl. No. 15/710,776; dated May 21, 2020; 42 pages.

Non-Final Office Action received for U.S. Appl. No. 15/710,776, dated Apr. 30, 2021, 18 pages.

Final Office Action received for U.S. Appl. No. 15/710,776, dated Oct. 20, 2021, 18 pages.

Canas et al., "CMAPTOOLS: A Knowledge Modeling and Sharing Environment", Pamplona, Spain, 2004, 9 pages.

Non Final Office Action received for U.S. Appl. No. 15/710,776, dated Mar. 25, 2022, 20 pages.

Final Office Action received for U.S. Appl. No. 15/710,776, dated Oct. 18, 2022, 24 pages.

Advisory Action received for U.S. Appl. No. 15/710,776, dated Feb. 7, 2023, 4 pages.

* cited by examiner

Layout Type 240 = "circular"

Layout Type 240 = "slice"

Layout Type 240 = "projection"

TECHNIQUES FOR MIXED-INITIATIVE VISUALIZATION OF DATA

CROSS-REFERENCE TO RELATED APPLICATIONS

This application claims the priority benefit of the U.S. Provisional Patent Application having Ser. No. 62/398,433 and filed on Sep. 22, 2016. The subject matter of this related application is hereby incorporated herein by reference.

BACKGROUND OF THE INVENTION

Field of the Invention

Embodiments of the present invention relate generally to computer science and, more specifically, to techniques for mixed-initiative visualization of data.

Description of the Related Art

In sense making operations, users attempt to analyze, interpret, and extract meaning from various data sets. During sense making operations, users oftentimes annotate their data sets in order to document and communicate observations and hypotheses about the data sets. For example, as part of analyzing a relatively large data set, various users could annotate the data set with a wide range of light-weight annotations and heavy-weight annotations, where the light-weight annotations may include short tags, and the heavy-weight annotations may include long comments.

As the size and complexity of a data set grow, the number and diversity of annotations associated with the data set oftentimes increase as well. In addition, as the size and complexity of a data set grow, the complexity of the relationships between the different annotations and the data set typically increases too. For example, a user could structure a hierarchical relationship between tags and comments to provide insights into the data set at different levels of detail. Subsequently, the user could create relationships between specific tags, comments, and data items included in the data set to organize those insights.

Many text based editing tools provide both an in-line view that displays annotations in-line with the associated data set and an annotation summary view that displays the annotations independently of the data set. Accordingly, a user can perform sense making operations by analyzing the annotations made to the associated data set via the in-line view. Alternatively or in addition, the user can perform sense making operations by analyzing the relationship among different annotations via the annotation summary view. One drawback of performing sense making operations in this fashion is that discerning patterns among annotations in the context of a given data set typically involves manually viewing both an in-line view and an annotation summary view of the data set. Such a manual process is oftentimes difficult, disjointed, and quite time-consuming.

To reduce the time required to analyze, interpret, and extract meaning from a given data set, a user may attempt to analyze the data set and the different annotations associated with that data set with a text mining tool. Generally, text mining tools attempt to automatically detect patterns in text and then evaluate and interpret those patterns. One drawback of analyzing a data set and its associated annotations with a text mining tool is that the text mining tool has to be configured to detect the salient aspects of the data set. The salient aspects of a data set may include, without limitation, task and domain specific terms, jargon, and concepts. For many data sets, the time and expertise required to configure a text mining tool to facilitate sense making on the data set exceeds the time and expertise required to manually perform sense making operations on the data set.

As the foregoing illustrates, what is needed in the art are more effective techniques for performing sense making operations on data sets.

SUMMARY OF THE INVENTION

One embodiment of the present invention sets forth a computer-implemented method for performing sense making operations on data sets. The method includes computing pairwise similarities among nodes associated with a data set; computing a graph layout based on the pairwise similarities and one or more user-specified constraints; and rendering a graph for display based on the graph layout, the nodes, and one or more edges that connect two or more nodes included in the nodes.

One advantage of the disclosed techniques is that the techniques enable a user to efficiently perform sense making operations on the data set. Notably, the techniques provide a mixed-initiative approach to visualizing the data set that facilitates analysis of the data set. By interactively specifying constraints and then inspecting the topology of the automatically generated graph, the user may efficiently explore salient aspects of the data set.

BRIEF DESCRIPTION OF THE DRAWINGS

So that the manner in which the above recited features of the present invention can be understood in detail, a more particular description of the invention, briefly summarized above, may be had by reference to embodiments; some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
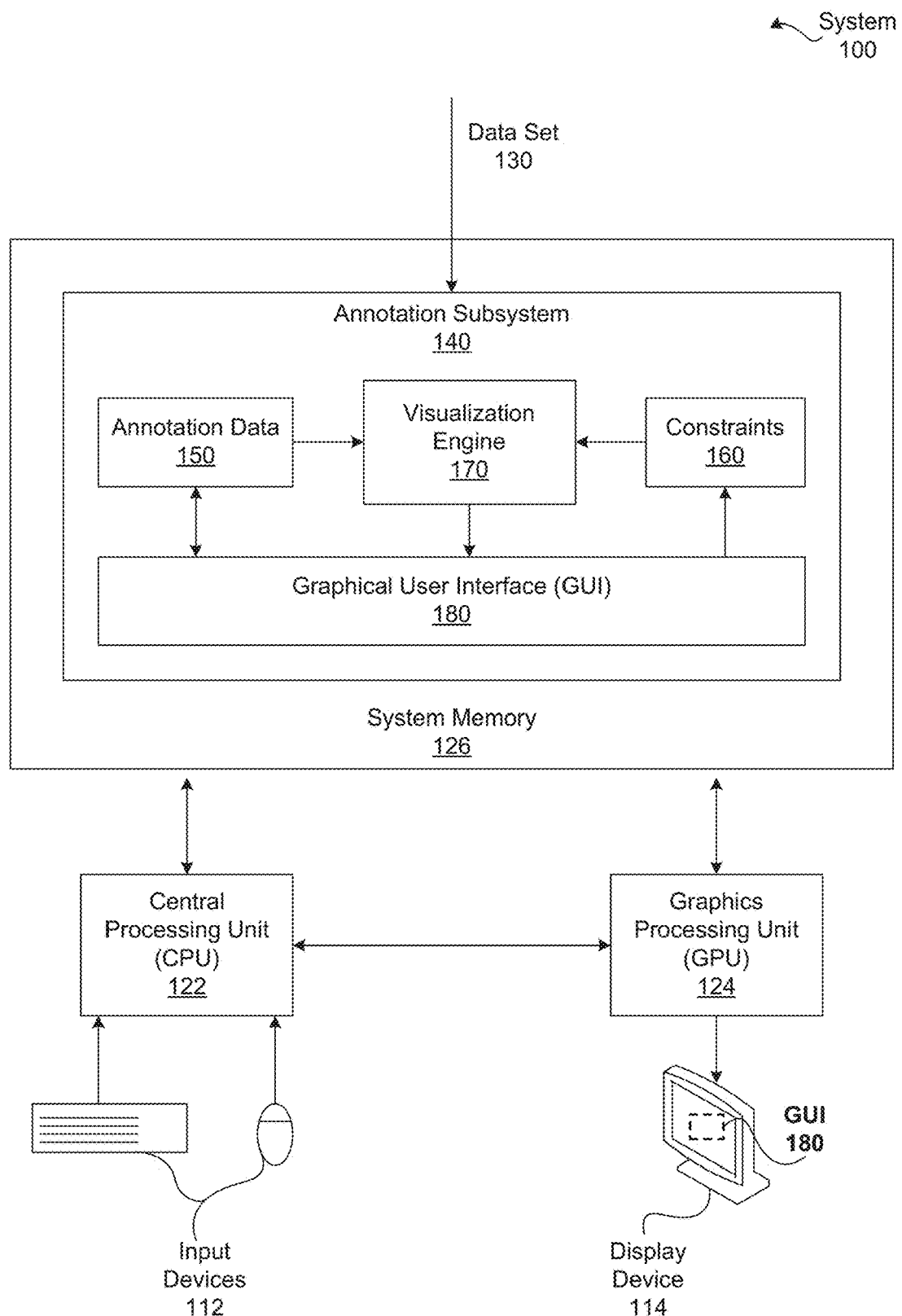
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a central processing unit (CPU) 122, input devices 112, a graphics processing unit (GPU) 124, a display device 114, and a system memory 126. For explanatory purposes, multiple instances of like objects are denoted with reference numbers identifying the object and parenthetical numbers identifying the instance where needed.

The CPU 122 receives user input from the input devices 112, such as a keyboard or a mouse. In operation, the CPU 122 is the master processor of the system 100, controlling and coordinating operations of other system components. In particular, the CPU 122 issues commands that control the operation of the GPU 124. The GPU 124 incorporates circuitry optimized for graphics and video processing, including, for example, video output circuitry. The GPU 124 delivers pixels to the display device 114 that may be any conventional cathode ray tube, liquid crystal display, light-emitting diode display, or the like.

In various embodiments, GPU 124 may be integrated with one or more of other elements of FIG. 1 to form a single system. For example, the GPU 124 may be integrated with the CPU 122 and other connection circuitry on a single chip to form a system on chip (SoC). In alternate embodiments, the CPU 122 and/or the GPU 124 may be replaced with any number of processors. Each of the processors may be any instruction execution system, apparatus, or device capable of executing instructions. For example, a processor could comprise a digital signal processor (DSP), a controller, a microcontroller, a state machine, or any combination thereof.

The system memory 126 stores content, such as software applications and data, for use by the CPU 122 and the GPU 124. The system memory 126 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 126. The storage may include any number and type of external memories that are accessible to the CPU 122 and/or the GPU 124. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the system 100 shown herein is illustrative and that variations and modifications are possible. The number of CPUs 122, the number of GPUs 124, the number of system memories 126, and the number of applications included in the system memory 126 may be modified as desired. Further, the connection topology between the various units in FIG. 1 may be modified as desired. In some embodiments, any combination of the CPU 122, the GPU 124, and the system memory 126 may be replaced with any type of distributed computer system or cloud computing environment, such as a public or a hybrid cloud.

In general, the system 100 enables users to perform sense making operations to analyze, interpret, and attempt to extract meaning from the data set 130. During sense making operations, users oftentimes annotate the data set 130 in order to document and communicate observations and hypotheses about the data set 130. As the size and complexity of the data set 130 grows, the number and diversity of annotations associated with the data set 130 oftentimes increase as well. In addition, as the size and complexity of the data set 130 grows, the complexity of the relationships between the different annotations and the data set 130 typically increases too.

As persons skilled in the art will recognize, performing sense making operations on the data set 130 and the associated annotations via text based editing tools typically involves manually viewing both an in-line view and an annotation summary view of he data set 130. Such a manual process is oftentimes difficult, disjointed, and quite time-consuming. To reduce the time required to analyze, interpret, and extract meaning from the data set 130, a user may attempt to analyze the data set 130 and the different annotations associated with that data set 130 with a text mining tool. Generally, text mining tools attempt to automatically detect patterns in text and then evaluate and interpret those patterns.

However, one drawback of analyzing the data set 130 and its associated annotations with a text mining tool is that the text mining tool has to be configured to detect the salient aspects of the data set 130. The salient aspects of the data set 130 may include, without limitation, task and domain specific terms, jargon, and concepts. For many data sets 130, the time and expertise required to configure a text mining tool to facilitate sense making on the data set 130 exceeds the time and expertise required to manually perform sense making operations on the data set 130.

Sense Making Operations on Data Sets

To enable users to effectively perform sense making operations on the data set 130, the system memory 100 includes, without limitation, an annotation subsystem 140. As shown, the annotation subsystem 140 includes, without limitation, annotation data 150, constraints 160, a visualization engine 170, and a graphical user interface (GUI) 180. In operation, the annotation subsystem 140 executes on the CPU 122 and/or the GPU 124, and configures the display device 114 to display the GUI 180. In general, the GUI 180 provides a variety of visual components (e.g., interface widgets, search widgets, panels, tabs, etc.) that enable the user to perform graphics based sense making operations on the data set 130 via the input devices 112.

More precisely, the GUI 180 enables the user to view and select items included in the data set 130, interact with the annotation data 150 that is associated with the data set 130, and influence an automatically generated annotation graph (not shown in FIG. 1) via the constraints 160. Notably, the items included in the data set 130 may be organized in any manner and across any number of hierarchical levels. For explanatory purposes only, an item included in the data set 130 is referred to herein as a "data item" and is associated with a hierarchical level. The annotation data 150 includes annotations as well as data items that are associated with annotations. Examples of annotations include comments and tags. For explanatory purposes only, a data item that is associated with at least one annotation is also referred to herein as an "annotated data item."

The visualization engine 170 automatically generates the annotation graph based on the annotation data 150 and the constraints 160. The annotation graph is defined by a topology and a layout. To generate the topology of the annotation graph, the visualization engine 170 encodes annotation semantics that describe the content of and relationships among nodes that represent the different annotations and annotated data items included in the annotation data 150. To generate the layout of the annotation graph, the visualization engine 170 automatically infers similarities among the different annotations and annotated data items and then organizes the nodes based on the similarities and the user-specified constraints 160.

In this fashion, the visualization engine 170 implements a "mixed-initiative" visualization of the annotation data 150 in which the user influences an automatically generated layout of the annotation graph. Notably, by interactively constraining the layout of the annotation graph and then inspecting the topology of the automatically generated annotation graph, the user may efficiently explore salient aspects of the data set 130 via the annotation data 150.

Note that the techniques described herein are illustrative rather than restrictive, and may be altered without departing from the broader spirit and scope of the invention. Many modifications and variations on the functionality provided by the annotation subsystem 140 and the visualization engine 170 will be apparent to those of ordinary skill in the art without departing from the scope and spirit of the described embodiments. In various embodiments, any number of the techniques may be implemented while other techniques may be omitted. Alternate embodiments include any application that implements a mixed-initiative process that combines computed similarities among data with any number and type of user-specified constraints to generate any type of graph.

For instance, in some alternative embodiments, the system 100 may not include the annotation subsystem 140 and the annotation data 150. In such embodiments, the visualization engine 170 may operate directly on the data items instead of the annotation data 150 to generate a data graph instead of an annotation graph. The data set 130 may include any number and type of data items, and the associated data graph may include any number and type of nodes. To generate the layout of the data graph, the visualization engine 170 may automatically infer similarities from the data set 130 and then organize the nodes based on the similarities and the user-specified constraints 160.

In alternate embodiments, the system memory 126 may not include the annotation subsystem 140 and/or the visualization engine 170. In some embodiments, the annotation subsystem 140 and/or the visualization engine 170 may be stored on computer readable media such as a CD-ROM, DVD-ROM, flash memory module, or other tangible storage media. Further, in some embodiments, the annotation subsystem 140 and/or the visualization engine 170 may be provided as an application program (or programs) stored on computer readable media such as a CD-ROM, DVD-ROM, flash memory module, or other tangible storage media.

The components illustrated in the system 100 may be included in any type of system 100, e.g., desktop computers, server computers, laptop computers, tablet computers, and the like. Additionally, the annotation subsystem 140 and/or the visualization engine 170 may execute on distributed systems communicating over computer networks including local area networks or large, wide area networks, such as the Internet. The annotation subsystem 140 and the visualization engine 170 described herein are not limited to any particular computing system and may be adapted to take advantage of new computing systems as they become available.

In alternate embodiments, the functionality of the annotation subsystem 140 and the visualization engine 170 may be implemented and provided in any technically feasible fashion. In various embodiments, the functionality of the annotation subsystem 140 and/or the visualization engine 170 is integrated into or distributed across any number (including one) of software applications. Further, in some embodiments, each of the annotation subsystem 140 and the visualization engine 170 may execute on different instruction execution systems. For instance, in some embodiments the functionality of the visualization engine 170 may be provided as a cloud-based service.

Mixed-Initiative Visualization of Annotation Data

Figure 2:
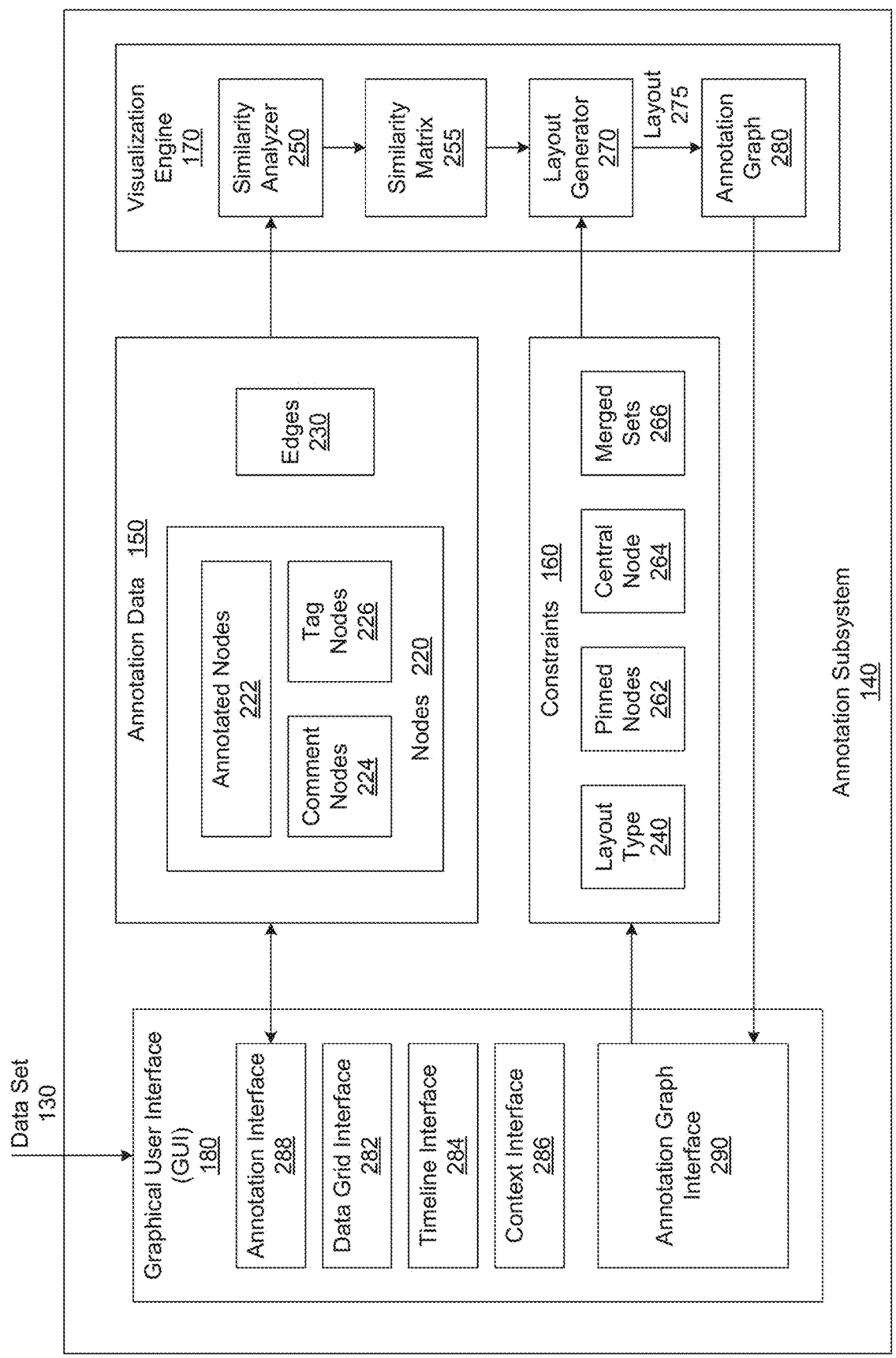
FIG. 2 is a more detailed illustration of the annotation subsystem of FIG. 1, according to various embodiments of the present invention.

FIG. 2 is a more detailed illustration of the annotation subsystem 140 of FIG. 1, according to various embodiments of the present invention. As shown, the GUI 180 includes, without limitation, a data grid interface 282, a timeline interface 284, a context interface 286, an annotation interface 288, and an annotation graph interface 290. In alternate embodiments, the GUI 180 may include any number and type of interfaces. For instance, in some embodiments, the GUI 180 may include multiple different context interfaces 286.

For the data set 130, the annotation subsystem 140 generates and renders for display, without limitation, any number of a table view via the data grid interface 282, a timeline view via the timeline interface 284, and a context view via the context interface 286. For the annotation data 150, the annotation subsystem 140 generates and renders for display, without limitation, any amount of the annotation data 150 via the annotation interface 288 and the annotation graph 280 via the annotation graph interface 290. The annotation subsystem 140 may configure any number of the data grid interface 282, the timeline interface 284, the context interface 286, the annotation interface 288, and the annotation graph interface 290 to interact in any technically feasible fashion. For instance, in some embodiments, if a user selects a data item via the data grid interface 282, then the annotation subsystem 284 configures the timeline interface 284, the context interface 286, and the annotation interface 288 to highlight the selected data item.

Together, the data grid interface 282, the timeline interface 284, and the context interface 286 enable the user to view and select data items included in the data set 130. Since the data items may be organized in any manner and across any number of hierarchical levels, the data grid interface 282, the timeline interface 284, and the context interface 286 may be configured to operate across any number of hierarchy levels in any technically feasible fashion.

In general, the data grid interface 282 reveals a logical structure of the data set 130 via a visualization of a table, and enables the user to select data items across rows and columns included in the table. The timeline interface 284 reveals a temporal structure of data items that are selected in the data grid interface 282 via a visualization of a timeline, and enables the user to fine-tune the selected data items across time intervals. The context interface 286 reveals a spatial structure associated with the data set 130 in a contextually-relevant fashion. For example, the context interface 286 could reveal a spatial structure associated with the data set 130 via a 3D graph or a heat map of the data set 130. Each of the data grid interface 282, the timeline interface 284, and the context interface 286 indicate which of the data items are selected as well as which of the data items are associated with annotations. As described previously herein, a data item that is associated with one or more annotations is also referred to herein as an annotated data item.

As shown, the annotation data 150 includes, without limitation, nodes 220 and edges 230. The nodes 220 and the edges 230 are included in an annotation graph 280. Each node 220 is associated with a position in a layout 275 of the annotation graph 280, an annotated data item or an annotation, and one or more of the edges 230. The annotation subsystem 140 supports two types of annotations and three types of the nodes 220. In alternate embodiments, the annotation subsystem 140 may support any number of types of annotations and any number of types of the nodes 220. Each annotation comprises either a comment that is unstructured text or a tag that is a single word.

The type of each of the nodes 220 is one of "annotated," "comment," or "tag." If a given node 220 is associated with an annotated data item, then the type of the node 220 is annotated, and the node 220 is also referred to herein as an annotated node 222. If a given node 220 is associated with a comment, then the type of the node 220 is comment, and the node 220 is also referred to herein as a comment node 224. If a given node 220 is associated with a tag, then the type of the node 220 is tag, and the node 220 is also referred to herein as a tag node 226.

Each of the edges 230 represents a "between-type" connection between one or the nodes 220 of one type and one of the nodes 220 of a different type. More specifically, a given edge 230 represents a connection between one of the annotated nodes 222 and one of the comment nodes 224, one of the annotated nodes 222 and one of the tag nodes 226, or one of the comment nodes 224 and one of the tag nodes 226. In alternate embodiments, the edges 230 may represent connections between any number and types of the nodes 230 in any technically feasible fashion.

The annotation interface 288 enables a user to view, select, create, and modify the annotation data 150. The annotation interface 288 may include any number and type of interface widgets and may support text based as well as graphics based interaction with the annotation data 150. Upon receiving a new comment that is associated with a data item via the annotation interface 288, the annotation subsystem 140 generates a new comment node 224 based on the comment. If the associated annotated node 222 does not exist, then the annotation subsystem 140 generates the associated annotated node 222. The annotation subsystem 140 then generates the edge 230 between the new comment node 224 and the associated annotated node 222. Finally, if the comment is also associated with tag(s), then the annotation subsystem 140 generates the edge 230 between the new comment node 224 and the associated tag node(s) 226.

Similarly, upon receiving a new tag that is associated with a data item via the annotation interface 288, the annotation subsystem 140 generates a new tag node 226 based on the tag. If the associated annotated node 222 does not exist, then the annotation subsystem 140 generates the associated annotated node 222. The annotation subsystem 140 then generates the edge 230 between the new tag node 226 and the associated annotated node 222. Finally, if the tag is also associated with comment(s), then the annotation subsystem 140 generates the edge 230 between the new tag node 226 and the associated comment node(s) 224.

In various embodiments, the annotation subsystem 140 may coordinate any number of automated interactions between the annotation interface 288 and any number of other interfaces. For instance, in some embodiments, if a data item is selected in the data grid interface 282 or the timeline interface 284, then the annotation subsystem 140 automatically configures the annotation interface 288 to represent the selected data item and any associated annotations. In a complementary fashion, if an annotation is created via the annotation interface 288, then the annotation subsystem 140 highlights the associated data item in the data grid interface 282, the timeline interface 284, and the context interface 286.

The annotation graph interface 290 facilitates continuous visualization and exploration of the annotation semantics that are generated via the annotation interface 288 in the context of the data set 130. In operation, the visualization engine 170 renders the annotation graph 280 for display. The annotation graph interface 290 then displays the annotation graph 280 that visually depicts the annotation data 150, and enables the user to define and interact with the constraints 160 that influence the layout 275 of the annotation graph 280. As part of displaying the annotation graph 280, the annotation graph interface 290 visually depicts various characteristics of the nodes 220 and the edges 230 included in the annotation graph 280. For instance, in some embodiments, the annotation graph interface 290 depicts the annotated nodes 222 in one color, the comment nodes 224 in a second color, and the tag nodes 226 in a third color. Further, in various embodiments, the annotation graph interface 290 depicts each of the nodes 220 as a circle, where the size of the circle corresponds to the number of the edges 230 that are associated with the node 220.

As shown, the constraints 160 include, without limitation, a layout type 240, pinned nodes 262, a central node 264, and merged sets 266. The layout type 240 defines a general layout scheme that influences the organization and appearance of the annotation graph 280. The layout type 240 is one of "projection," "slice," or "circular." Each of the layout types 240 enables the user to view the annotation data 150 in a different manner to facilitate sense making operations. For example, the user could set the layout type 240 to projection to obtain a global view of the annotation data 150 in the context of the data set 130. Subsequently, the user could set the layout type 240 to slice to investigate connections among the comment nodes 222. Finally, the user could set the layout type 240 to circular to investigate relationships and similarities with respect to a specific node 220 of interest.

Each of the pinned nodes 262 specifies a fixed position for one of the nodes 220, and the user may specify any number of the pinned nodes 262. For explanatory purposes only, the set of the nodes 220 that are not specified as the pinned nodes 262 are referred to herein as "unpinned" nodes 220. The central node 264 specifies that one of the nodes 220 is a central node of interest. For explanatory purposes only, the nodes 220 that are not specified as the central node 264 are referred to herein as "non-central" nodes 220.

Each of the merged sets 266 designate two or more of the nodes 220 as a single node 220. For example, suppose that the user were to determine that the three tag nodes 226(1-3) associated with, respectively, the tags "error," "mistake," and "Error" referred to the same concept. The user could specify the three tag nodes 226(1-3) as the merged set 266(1), and the annotation subsystem 140 would subsequently process the merged set 266(1) as a single node 220.

Notably, the annotation subsystem 140 processes each of the remaining constraints 160 in the context of the layout type 240. For instance, if the layout type 240 is projection or slice, then the annotation subsystem 140 disregards the central node 264. By contrast, if the layout type 240 is circular, then the annotation subsystem 140 disregards the pinned nodes 262. In alternate embodiments, the annotation graph interface 290 and the annotation subsystem 140 may support any number and type of layout types 240 and any number of additional constraints 160 in any technically feasible fashion.

In operation, as the annotation subsystem 140 updates the annotation data 150 and the constraints 160 based on the user input, the annotation subsystem 140 configures the visualization engine 170 to automatically (re)generate the annotation graph 280. In this fashion, the annotation subsystem 140 supports a mixed-initiative approach to graphically depicting the annotation data 150 in which the automatically generated annotation graph 280 reflects user input.

As shown, the visualization engine 170 includes, without limitation, a similarity analyzer 250, a similarity matrix 255, a layout generator 270, and the annotation graph 280. The similarity analyzer 250 computes the similarity matrix 255 based on the annotation data 150. Subsequently, the layout generator 270 generates the layout 275 of the annotation graph 280 based on the similarity matrix 255 and the constraints 160. Finally, the visualization subsystem 160 generates the annotation graph 280 based on the layout 275 and the relationships between the nodes 220 and the edges 230.

Upon receiving new annotation data 150, the similarity analyzer 250 computes pairwise similarities between the nodes 220 to generate the similarity matrix 255. The similarity analyzer 250 computes the pairwise similarities based on both between-type similarities and within-type similarities. In alternate embodiments, the similarity analyzer 250 may compute the pairwise similarities in any technically feasible fashion and based on any technically feasible criteria. For example, in some alternate embodiments, the annotation subsystem 140 may support only one data type, and the similarity analyzer 250 may compute pairwise similarities based on only the within-type similarities.

The similarity analyzer 250 computes between-type similarities between pairs comprising one of the annotated nodes 222 and one of the comment nodes 224, pairs comprising one of the annotated nodes 222 and one of the tag nodes 226, and pairs comprising one of the comment nodes 224 and one of the tag nodes 226. By contrast, the similarity analyzer 250 computes within-type similarities between pairs of the annotated nodes 222, pairs of the comment nodes 224, and pairs of the tag nodes 226 based on type-specific algorithms.

In general, the similarity analyzer 240 computes between-type similarities based on the edges 230. More specifically, if a pair of the nodes 220 of different types are connected via one of the edges 230, then the similarity analyzer 250 sets the corresponding between-type similarity to a between-type similarity constant. By contrast, if a pair of nodes 220 of different types is not connected via any of the edges 240, then the similarity analyzer 250 sets the between-type similarity of zero. The similarity analyzer 240 may determine the between-type similarity constant in any technically feasible fashion. For example, in some embodiments, the GUI 180 may enable the user to define the between-type similarity constant. In another example, in other embodiments, the between-type similarity constant may be predefined as 0.7. In alternate embodiments, the similarity analyzer 250 may compute the between-type similarities in any technically feasible fashion.

The similarity analyzer 250 computes the within-type similarities between pairs of the annotated nodes 222 based on a weighted aggregation of at least one of a selected row overlap, a selected column overlap, and a selected time interval overlap between the two annotated nodes 222. For example, the similarity analyzer 250 could compute the within-type similarities between a pair of the annotated nodes 222 as "A*selectedRowOverlap+ B*selectedColumnOverlap+ C*SelectedTimeIntervalOverlap." As referred to herein, A, B, and C are weights. The similarity analyzer 250 may determine the weights in any technically feasible fashion. For example, the GUI 180 could enable the user to define different weights for the selected row overlap, the selected column overlap, and the selected time overlap. In alternate embodiments, the similarity analyzer 250 may compute the within-type similarities between pairs of the annotated nodes 222 in any technically feasible fashion.

The similarity analyzer 250 computes the within-type similarities between pairs of the comment nodes 224 based on a bags-of-words model. In the bag-of-words model, each comment is represented as a vector of frequencies of the words included in the comment. For example, the similarity analyzer 250 could compute within-type similarities between the comment node $222(x)$ and the comment node $222(y)$ as "cos(BoW$_x$, BoW$_y$)." As referred to herein, BoW$_x$ is a bag-of-words transformation applied to the comment node $222(x)$, and BoW$_y$ is a bag-of-words transformation applied to the comment node $222(y)$. In alternate embodiments, the similarity analyzer 250 may compute the within-type similarities between pairs of the comment nodes 224 in any technically feasible fashion.

The similarity analyzer 250 computes the within-type similarities between pairs of the tag nodes 226 based on at least one of word semantic meanings, characters, and co-occurrences in comments. For example, the similarity analyzer 250 could compute the within-type similarities between the tag node $226(x)$ and the tag node $226(y)$ as a weighted aggregation: "J*cos(Vec$_x$, Vec$_y$)+K*ch($226(x)$, $226(y)$)+L*Co($226(x)$, $226(y)$))." As referred to herein, Vec$_x$ is a transformation of the tag node 226 to a corresponding vector representation, and Vec$_y$ is a transformation of the tag node $226(y)$ to a corresponding vector representation. The factor, "ch($226(x)$, $226(y)$)" is a similarity between the tag nodes $226(x)$ and $226(y)$ based on a Dice's coefficient of bi-gram character sets associated with the tag nodes $226(x)$ and $226(y)$. The factor "Co($226(x)$, $226(y)$)" represents normalized co-occurrences of the tags associated with the tag nodes $226(x)$ and $226(y)$ within the comments associated with the comment nodes 224. Finally, J, K, and L represent weights, and the similarity analyzer 240 may determine the weights in any technically feasible fashion. In alternate embodiments, the similarity analyzer 250 may compute the within-type similarities between pairs of the tag nodes 226 in any technically feasible fashion.

Notably, if the annotation data 150 (including, without limitation, the selected data items, the annotations, the nodes 220, and the edges 230) changes, then the similarity analyzer 150 regenerates the similarity matrix 255. However, if the constraints 160 change, then the similarity analyzer 250 does not necessarily regenerate the similarity matrix 244. More specifically, if the constraints 160 change but the annotation data 150 does not change, then the similarity analyzer 250 does not regenerate the similarity matrix 255.

The layout generator 270 generates the layout 275 of the annotation graph 280 based on, without limitation, the similarity matrix 255 and the constraints 160. Accordingly, as the annotation data 150 and/or the constraints 160 change, the layout generator 270 regenerates the layout 275. In operation, the layout generator 270 implements a different layout algorithm for each of the three different layout types 240. In alternate embodiments, the layout generator 270 may execute any number and type of layout algorithms based on any number and combination of the constraints 160.

If the layout type 240 is "projection," then the layout generator 270 implements a three step layout process that positions the unpinned nodes 220 based on a global optimization of the pairwise similarities included in the similarity matrix 255. Consequently, similar nodes 220 cluster together in the annotation graph 280. In the first step, the layout generator 270 executes a multidimensional scaling (MDS) algorithm that computes positions for each of the unpinned nodes 220 in 2D space based on the the similarity matrix 255. The layout generator 270 may execute any MDS algorithm in any technically feasible fashion.

In the second step, the layout generator 270 adjusts the positions of the unpinned nodes 220 based on the position of the pinned nodes 262 and the similarity matrix 255. For instance, in some embodiments, the layout generator 270 computes an adjustment vector for an unpinned node 222(i) "v" as:

$$\nabla \text{Position}(v) = \alpha \sum_i S(v_i, v)(\text{Position}(v_i) - \text{Position}(v)) \quad (1)$$

In equation (1), "$v_i$" represents each of the pinned nodes 262 and "$s(v_i, v)$" is a corresponding element of the similarity matrix 255. "Position(x)" is the position associated with the node 222(x), and "$\alpha$" represents the strength of the "pulling" effect (e.g., 0.8) of the pinned nodes 262 on the unpinned nodes 220. In the third step, the layout generator 270 applies a repulsive force between the nodes 220 that modifies the positions of the unpinned nodes 220 to reduce any overlaps between the nodes 220.

If the layout type 240 is "slice," then the layout generator 270 constrains each of the nodes 220 to a vertical axis based on the type of the node 220. More precisely, the layout generator 270 sets a horizontal position of each of the annotated nodes 220 equal to a horizontal position of an annotated data axis (not shown in FIG. 2). By contrast, the layout generator 270 sets a horizontal position of each of the comment nodes 220 equal to a horizontal position of a comment axis. And the layout generator 270 sets a horizontal position of the comment nodes 226 equal to a horizontal position of a tag axis.

The layout generator 270 then implements a three step layout process. In the first step, the layout generator 270 executes a multidimensional scaling (MDS) algorithm that assigns vertical positions to each of the unpinned nodes 220 along the associated axis based on the the similarity matrix 255. The layout generator 270 may execute any MDS algorithm in any technically feasible fashion. In the second step, the layout generator 270 adjusts the vertical positions of the unpinned nodes 220 based on the positions of the pinned nodes 262 and the similarity matrix 255. In some embodiments, the layout generator 270 may compute the vertical adjustment for each of the unpinned nodes 220 based on a modified version of equation (1). In the third step, the layout generator 270 applies a repulsive force between the nodes 220 that modifies the vertical positions of the unpinned nodes 220 to reduce any overlaps between the nodes 220.

If the layout type 240 is circular, then the layout generator 270 centers the annotation graph 180 around the central node 264. The layout generator 270 then computes the positions of the non-central nodes 220 based on the position of the central node 264 and the similarities between the non-central nodes 220 and the central node 264 as specified in the similarity matrix 255. In operation, the layout generator 270 positions the central node 264 at a center of the annotation graph 280, positions the nodes 220 that are more similar to the central node 264 closer to the center, and positions the nodes 220 that are less similar to the central node 264 further from the center. The layout generator 270 disregards the fixed positions associated with the pinned nodes 264.

After the layout generator 270 generates a new layout 275, the visualization engine 170 generates the annotation graph 280 based on the layout 275, the nodes 220, and the edges 230. In general, the visualization engine 170 encodes annotation semantics that describe the content of and relationships among the nodes 220 and the edges 230, and organizes the nodes 220 based on the layout 275. In alternate embodiments, the annotation subsystem 140 and the visualization engine 170 may implement any number and type of algorithms to generate the similarity matrix 255, the layout 275, and the annotation graph 280 based on any number and type of data and constraints.

For instance, in some embodiments, the annotation subsystem 140 and the visualization engine 170 may support eight different layout types 240. Further, the GUI 180 may provide any number (including zero) of configuration interface(s) that enable the user to fine-tune parameters of the various algorithms. For example, the GUI 180 could provide a layout algorithm configuration interface that enables the user to specify "$\alpha$" included in equation (1). In alternate embodiments, the system 100 may not include the annotation subsystem 140, and the visualization engine 170 may generate a data graph based on the data set 130 and a corresponding set of user-defined constraints.

Exemplary GUI and Annotation Graphs

Figure 3:
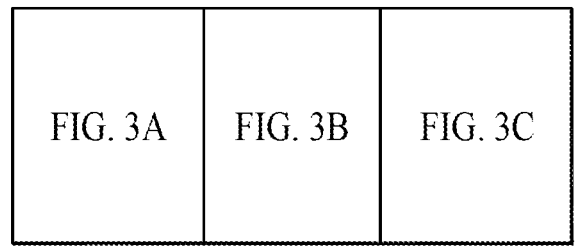
FIG. 3 illustrates an example of the graphical user interface of FIGS. 1 and 2, according to various embodiments of the present invention.
Figure 3A:
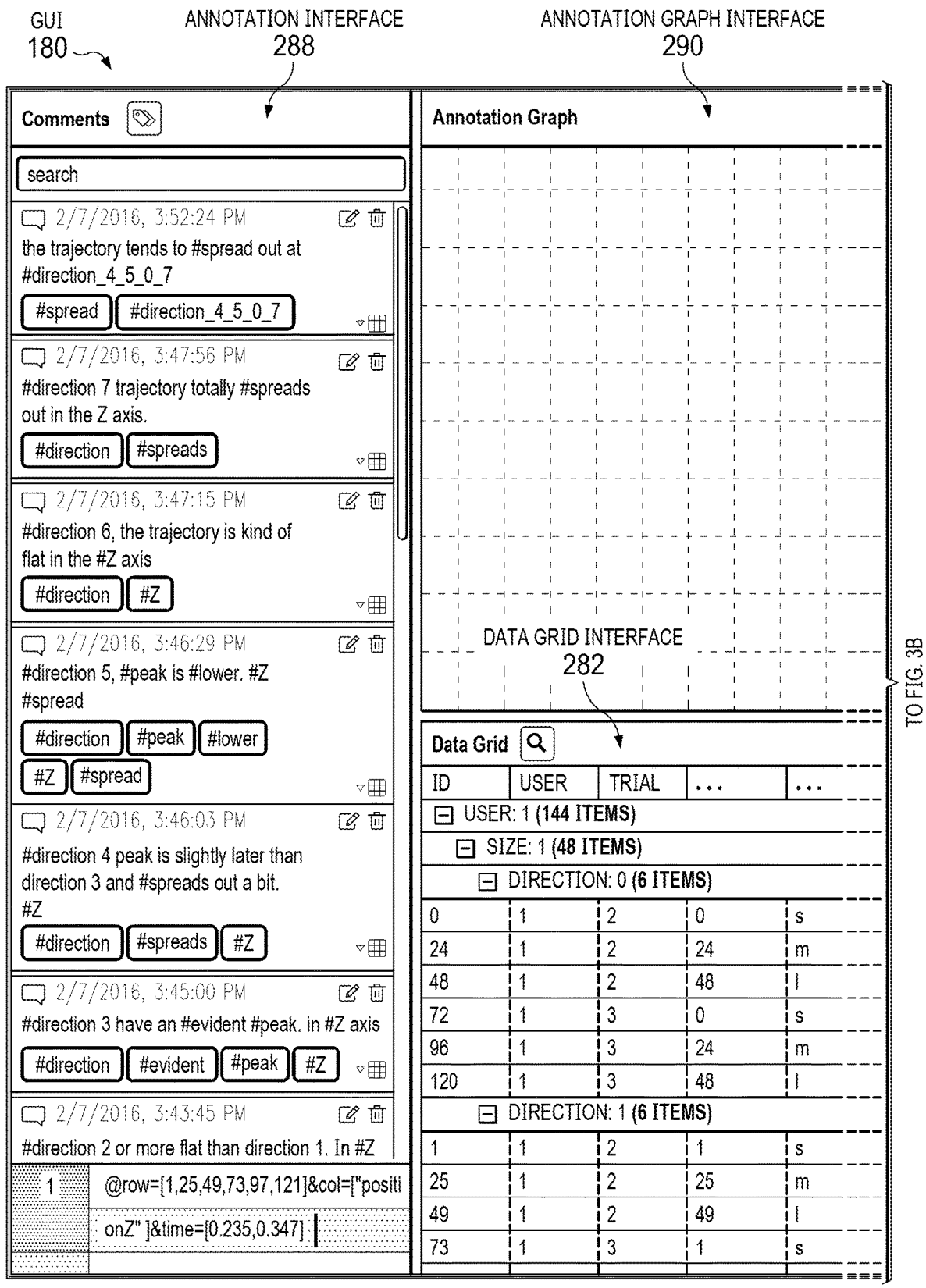
Figure 3B:
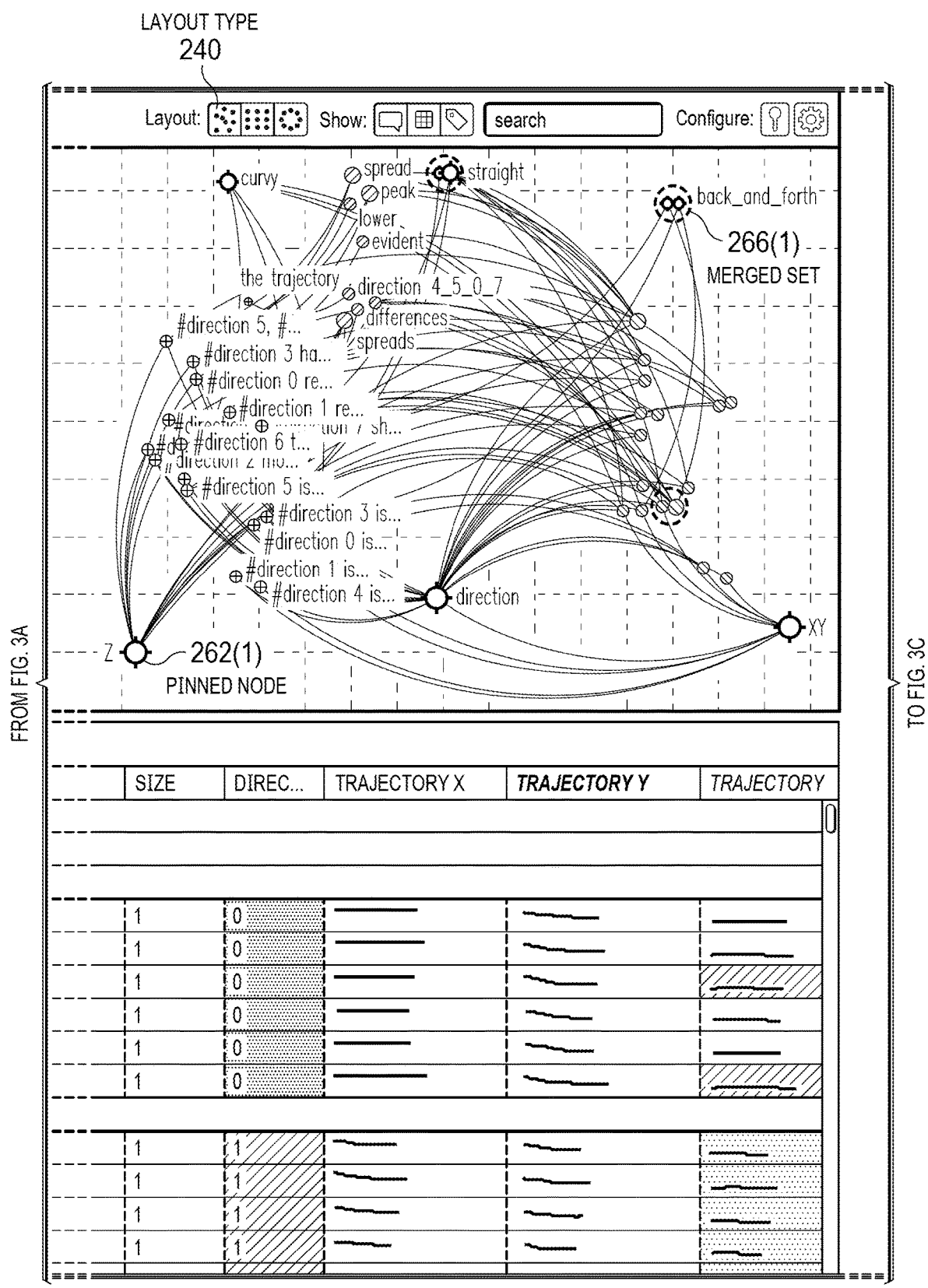
Figure 3C:
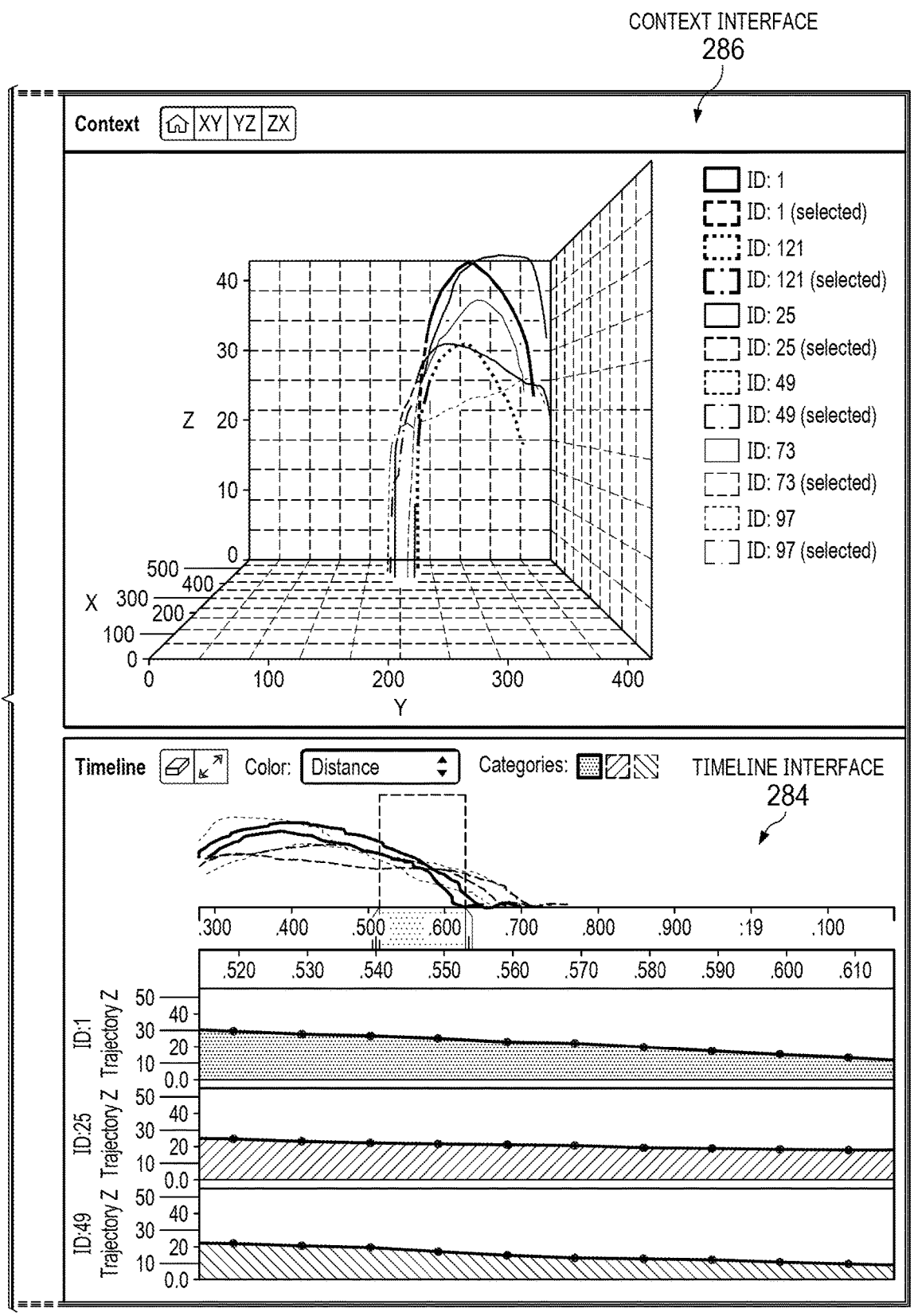

FIG. 3 illustrates an example of the graphical user interface (GUI) 180 of FIGS. 1 and 2, according to various embodiments of the present invention. More precisely, FIG. 3 depicts the appearance of the GUI 180 on the display device 114 at a particular point in time. As shown, FIG. 3 depicts the data grid interface 282, the timeline interface 284, the context interface 286, the annotation interface 288, and the annotation graph interface 290.

The data grid interface 282, the timeline interface 284, and the context interface 286 display the data items included in the data set 130 and indicate which of the data items are selected. Further, the data grid interface 282, the timeline interface 284, and the context interface 286 indicate which of the data items are associated with annotation(s) and, consequently, correspond to annotated nodes 222. For explanatory purposes only, in the context of FIG. 3, the data set 130 includes data items at a top hierarchical level that comprise observation records in an experimental study. For each observation record, the data set 130 also includes data items at lower hierarchical levels that comprise attributes (e.g., experimental condition, observed action, etc.) associated with the observation record.

As shown, the data grid interface 282 displays the data items as a table. In the example depicted, each row in the table represents a different observation record, while each column represents a different attribute of the record. Entries in the table may represent any type of data item in any technically feasible fashion. For example, a given entry may be a numerical value, a categorical value, an ordinal value, a textual value, an entire time-series that include continuous values and discrete events, or any other technically feasible construct.

The timeline interface 284 displays the time-series data items that are selected in the data gird interface 282. A top portion of the timeline interface 284 displays superimposed details of the selected time-series data items and a selected time interval. In a complementary fashion, a bottom portion of the timeline interface 284 displays a juxtaposed detail view of each of the selected time-series data items across the selected time interval.

The context interface 286 depicts a 3D view of trajectories that are associated with the data items that are selected in the data grid interface 282. In alternate embodiments, the context interface 286 may be customized to revel the spatial structure of the data set 130 in any context and in any technically feasible fashion. For example, the context interface 286 could depict a heat map of gestures that are associated with selected data items.

Together, the data grid interface 282, the timeline interface 284, and the context interface 286 facilitate efficient and detailed exploration of the data set 130. In particular, the data grid interface 282, the timeline interface 284, and the context interface 286 enable the user to select data items as part of detecting features and patterns of interest. Further, the data grid interface 282, the timeline interface 284, and the context interface 286 enable the user to efficiently isolate and compare regions of the data set 130 at different levels of granularity and across different structural characteristics. For example, a user could select observations records in the data grid interface 282 based on a task repetition number and then interact with the timeline interface 284 and the context interface 286 to investigate potential learning effects in a study.

The annotation interface 288 enables the user to view, select, create, and modify the annotation data 150. As shown, a top portion of the annotation interface 288 enables the user to create, view, and modify comments and tags that are associated with, respectively, the comment nodes 224 and the tag nodes 226. In addition, the top portion of the annotation interface 288 enables the user to associate any number of tags and comments with selected data items. A bottom portion of the annotation interface 288 enables the user to select data items for annotation purposes in a text based fashion via a text based notation. The annotation interface 288 may support any type of text based notation in any technically feasible fashion. In a complementary fashion, the data grid interface 282 and the timeline interface 284 enable the user to select data items for annotation purposes in a graphics based fashion. In general, as the annotation subsystem 140 receives the annotation data 150 via the annotation interface 288, the annotation subsystem 140 (re)generates the annotation graph 280.

As shown, the annotation graph interface 290 displays the annotation graph 280 that graphically depicts the dynamic relationships between the annotated data items, the comments, and the tags. As also shown, the annotation graph interface 290 supports selection of the annotation data 150 and enables the user to influence the annotation graph 280 via the constraints 160. In particular, the user may select the layout type 240 via a layout type interface widget that is situated in a center of a top portion of the annotation graph interface 290. The layout type interface widget visually depicts three available layout types 240. In various embodiments, the menu may include any number and type of other features and widgets that facilitate interactions with the annotation graph 280 and the constraints 160. For example, the menu may include a search widget.

In addition to configuring the layout type 240 via the menu, the user may create, modify, and/or delete any number and type of other constraints 160 via the displayed annotation graph 280. To create the pinned node 262(1), the user manually moves a given node 220 to a desired position and specifies that the node 220 is fixed to the position. To create the central node 264, the user selects the node 220 of interest and specifies that the selected node 220 is the central node 264. To create the merged set 266(1), the user performs drag-and-drop actions that move two or more of the nodes 220 to a single position and then designates the nodes 220 as the merged set 266(1)

Advantageously, by interacting with different interfaces included in the GUI 180, the user can efficiently perform sense-making operations based on the annotation data 150 in the context of the data set 130. For instance, in one exemplary workflow, the user could conceive an initial question with vague goals. As part of answering the initial question, the user could the examine the data set 130 via the data grid interface 282, the timeline interface 284, and the context interface 286. The user could then generate annotation data 150 via the annotation interface 288 to reflect interesting observations. As the user enters the annotation data 150, the user could view the annotation graph 280 via the annotation graph interface 290 and modify the constraints 160 to explore the annotation data 150 and generate explanations for the observations and an answer to the initial question.

Figure 4C:
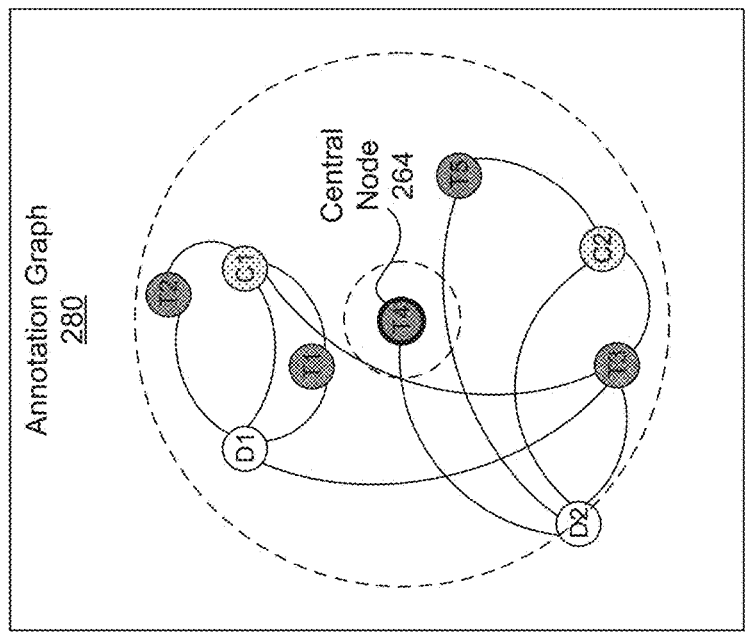
FIGS. 4A-4C illustrate examples of the annotation graph of FIG. 2 at three different times during sense making operations, according to various embodiments of the present invention.
Figure 4B:
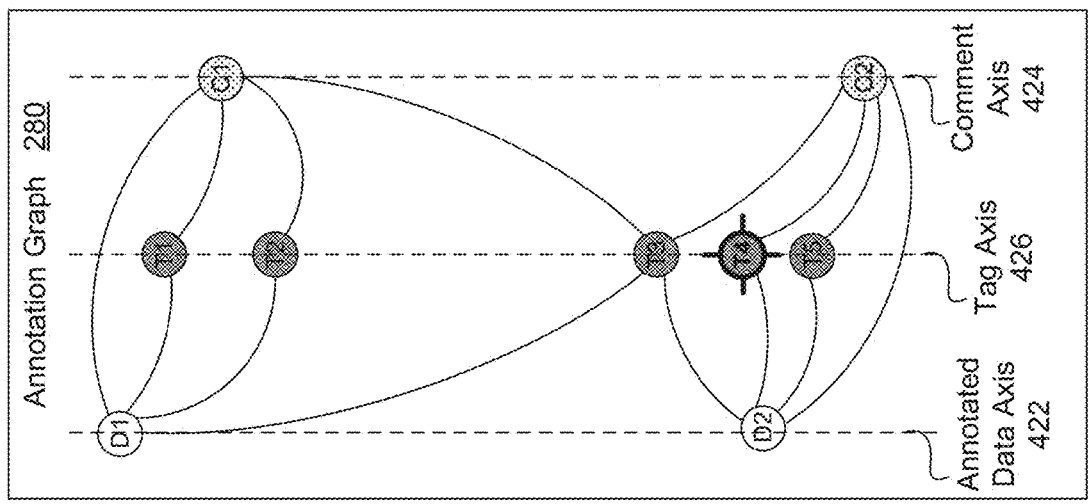
Figure 4A:
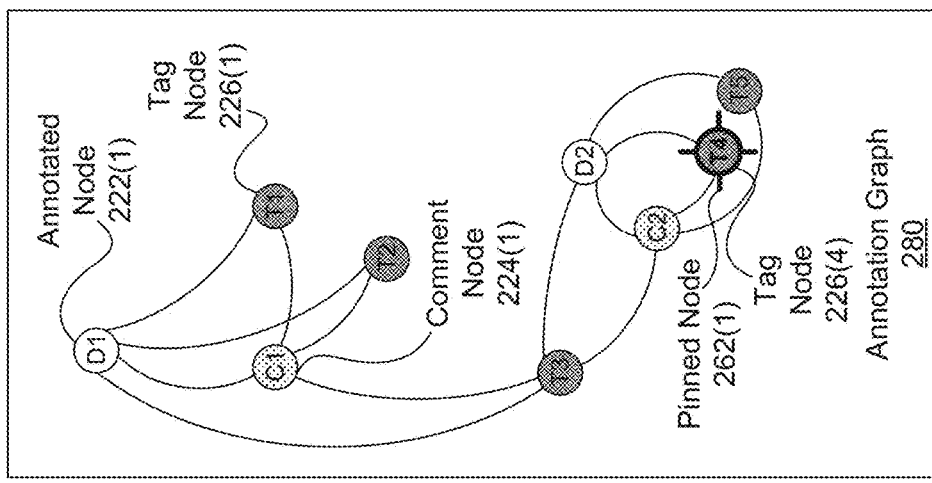

FIGS. 4A-4C illustrate examples of the annotation graph 280 of FIG. 2 at three different times during sense making operations, according to various embodiments of the present invention. For explanatory purposes only, the annotation data 150 includes, without limitation, two annotated nodes 222, two comment nodes 224, and five tag nodes 226. The two annotated nodes 222 are depicted as clear circles and are labeled "D1" and "D2." The two comment nodes 224 are depicted as lightly shaded circles and are labeled "C1" and "C2." The five tag nodes 226 are depicted as darkly shaded circles and are labeled "T1," "T2," "T3," "T4," and "T5," The annotation data 150 does not change during the sense making operations depicted in FIGS. 4A, 4B, and 4C.

Initially, the visualization engine 170 receives the annotation data 150 and the constraints 160 via the GUI 180. The constraints 160 include the layout type 240 and the pinned node 262(1). The layout type 240 is projection, and the pinned node 262(1) associates the tag node 226(4) that is labeled "T4" with a user-specified, fixed position within the annotation graph 280. The eight remaining nodes 220 are unpinned and, consequently, are not associated with any fixed positions.

The similarity analyzer 250 computes the similarity matrix 255 based on the annotation data 150. Subsequently, the layout generator 270 generates the layout 275 depicted in FIG. 4A based on the similarity matrix 255 and the constraints 160. Because the layout type 240 is projection, the layout generator 270 computes horizontal and vertical positions of the eight unpinned nodes 220 based on the fixed position of the pinned node 262(1) and the similarity matrix 255.

Subsequently, the visualization engine 170 receives a new layout type 240 of slice. The remaining constraints 160 are unchanged. Because the annotation data 150 is unchanged, the similarity analyzer 250 does not re-compute the similarity matrix 255. However, because the constraints 160 have changed, the layout generator 270 regenerates the layout 275 based on the similarity matrix 255 and the constraints 160.

As shown in FIG. 4B, since the layout type 240 is slice, the layout generator 270 constrains each of the nodes 220 to a vertical axis based on the type of the node 222. The layout generator 270 constrains each of the annotated nodes 222 to an annotated data axis 422, each of the comment nodes 224 to a comment axis 424, and each of the tag nodes 226 to a tag axis 426. The layout generator 270 then computes vertical positions of the eight unpinned nodes 220 based on the fixed vertical position of the pinned node 262(1) and the similarity matrix 255.

Subsequently, the visualization engine 170 receives new constraints 160 that specify that the layout type 240 is circular, and the tag node 226(4) "T4" is the central node 264. The remaining constraints 160 are unchanged. Because the annotation data 150 is unchanged, the similarity analyzer 250 does not re-compute the similarity matrix 255. However, because the constraints 160 have changed, the layout generator 270 regenerates the layout 275 based on the similarity matrix 255 and the constraints 160.

As shown in FIG. 4C, since the layout type 240 is circular, the layout generator 270 sets the position of the central node 264 to a center position of the annotation graph 280 and then computes the positions of the non-central nodes 220. More specifically, the layout generator 270 computes the positions of the non-central nodes 220 based on the fixed position of the central node 264 and the similarities between the non-central nodes 220 and the central node 264 as specified in the similarity matrix 255. In alternate embodiments, the visualization engine 170 may implement any number and type of algorithms to generate the similarity matrix 255 and the layout 255 based on any number and type of data and constraints. For example, the visualization engine 170 could support eight different layout types 240.

Figure 5:
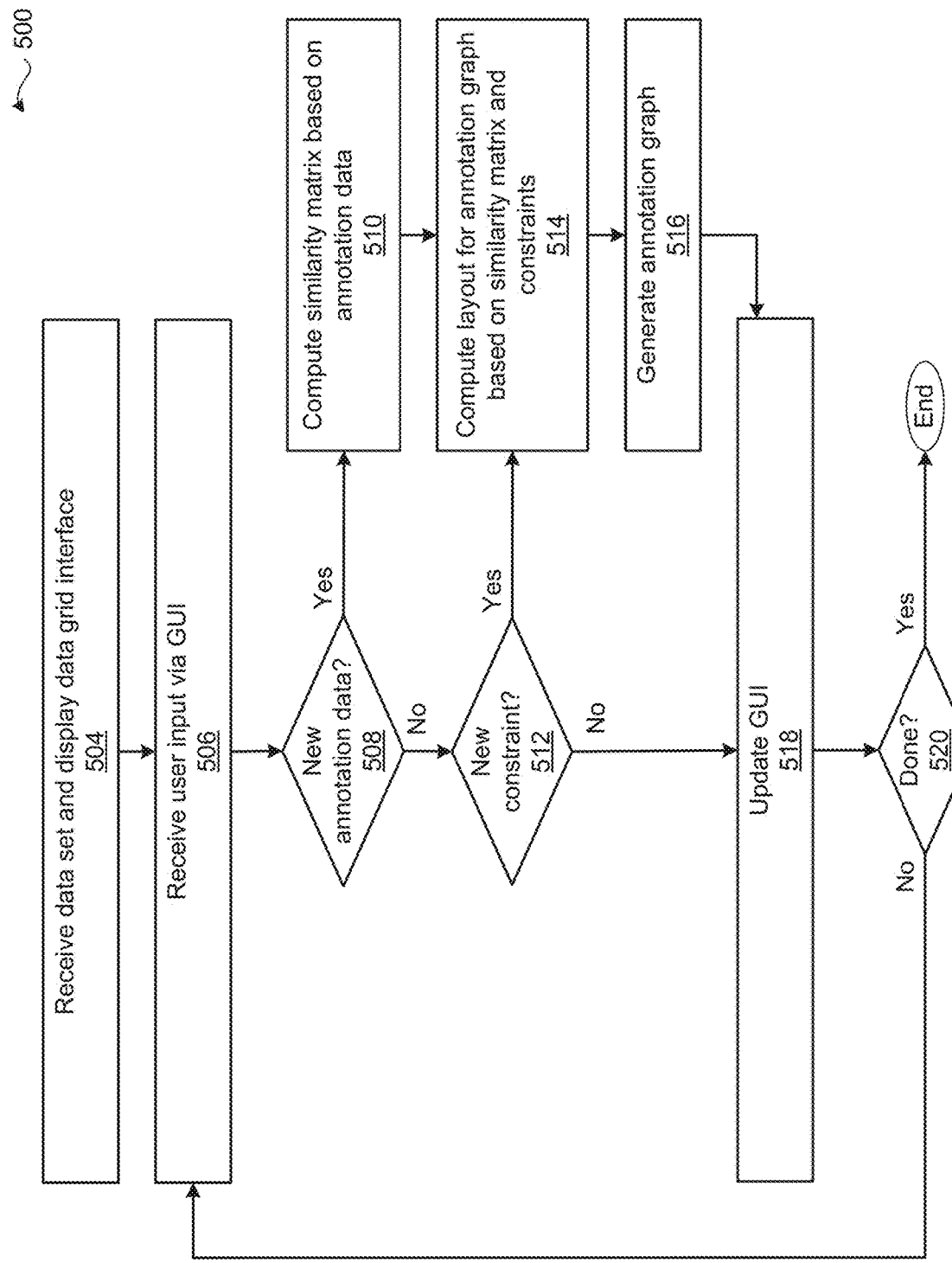
FIG. 5 is a flow diagram of method steps for performing sense making operations on data sets, according to various embodiments of the present invention.

FIG. 5 is a flow diagram of method steps for performing sense making operations on data sets, according to various embodiments of the present invention. Although the method steps are described with reference to the systems of FIGS. 1-4, persons skilled in the art will understand that any system configured to implement the method steps, in any order, falls within the scope of the present invention. For explanatory purposes only, the method steps are described in the context of performing sense making operations on the annotated data 150. In alternate embodiments, the method steps may be altered to perform sense making operations on any data set that may or may not be associated with annotation data, and the data set may include any number and type of items.

As shown, a method 500 begins at step 504, where the annotation subsystem 140 receives the data set 130 and configures the GUI 180 to display the grid interface 282. At step 506, the annotation subsystem 140 receives user input via the GUI 180. The user input may involve the data set 130, the annotation data 150, and/or the constraints 160. For example, the user could change the selected data items via the annotation interface 288, the data grid interface 282, or the timeline interface 284. Alternatively, the user could change the annotation data 150 via the annotation interface 288, or the constraints 160 via the annotation graph interface 190. In alternate embodiments, the GUI 180 may include any number and type of interfaces, and the GUI 180 may receive any type of user input in any technically feasible fashion via any of the interfaces.

At step 508, the annotation subsystem 140 determines whether the user input specifies new annotation data 150. If, at step 508, the annotation subsystem 140 determines that the user input specifies new annotation data 150, then the method 500 proceeds to step 510. At step 510, the similarity analyzer 250 computes the similarity matrix 255 based on the annotation data 150, and the method 500 proceeds directly to step 514.

If, however, at step 508, the annotation subsystem 140 determines that the user input does not specify new annotation data 150, then the method 500 proceeds directly to step 512. At step 512, the annotation subsystem 140 determines whether the user input specifies a new constraint 160. If, at step 512, the annotation subsystem 140 determines that the user input specifies a new constraint 160, then the method 500 proceeds to step 514.

At step 514, the layout generator 270 computes the layout 275 associated with the annotation graph 280 based on the similarity matrix 255 and the constraints 160. At step 516, the visualization engine 170 generates the annotation graph 280 based on the layout 275, the nodes 220, and the edges 230. If, however, at step 512, the annotation subsystem 140 determines that the user input does not specify a new constraint 160, then the method 500 proceeds directly to step 518.

At step 518, the annotation subsystem 140 updates the GUI 180. As part of step 518, the annotation subsystem 140 may update any number and combination of the annotation interface 288, the data grid interface 282, the timeline interface 284, the context interface 286, and the annotation graph interface 290. In various embodiments, the GUI 180 may include any number and type of interfaces and the GUI 180 may update any number and combination of the interfaces based on any criteria.

At step 520, the annotation subsystem 140 determines whether the annotation subsystem 140 is to cease operating. If, at step 520, the annotation subsystem 140 determines that the annotation subsystem 140 is to cease operating, then the method 500 terminates. If, however, at step 520, the annotation subsystem 140 determines that the annotation subsystem 140 is to continue operating, then the method 500 returns to step 506, where the annotation subsystem 140 receives new user input via the GUI 180.

The annotation subsystem 140 continues to cycle through steps 506-520 until the annotation subsystem 140 determines that the annotation subsystem 140 is to cease operating. In this fashion, the annotation subsystem 140 enables the user to perform sense making operations on the data set 130. Notably, as the annotation subsystem 140 operates, the user may modify the annotation data 150 and the constraints 160 to efficiently reveal patterns among the annotation data 150 in the context of the data set 130.

In sum, the disclosed techniques may be used to perform sense making operations on data sets. An annotation subsystem includes, without limitation, a visualization engine, annotations, and constraints. In operation, the annotation subsystem displays a GUI that enables the user to view and select data items included in a data set, view and create annotations that are associated with the data items, and interact with an annotation graph via the constraints. The annotation graph topology encodes annotation semantics that describe the content of and relationships among nodes that represent annotated data items, comments, and tags.

Notably, as the user interacts with the annotation subsystem via the GUI, the visualization engine automatically (re)generates the annotation graph based on the annotations and constraints. Upon receiving a modification to any of the annotations, the visualization engine computes a similarity matrix that includes pairwise similarities for the nodes included in the the annotation graph. After computing the similarity matrix or receiving a modification to any of the constraints, the visualization engine computes a layout for the annotation graph based on the similarity matrix and the constraints. More specifically, the visualization engine positions the nodes within the annotation graph based on the similarity matrix while complying with the constraints.

Advantageously, the annotation subsystem enables a comprehensive, mixed-initiative process for performing sense making operations on data sets. In particular, by interactively constraining the layout of the annotation graph and then inspecting the topology of the automatically generated annotation graph, the user may efficiently explore salient aspects of a given data set. By contrast, discerning patterns among annotations in the context of the data set via text based editing tools is oftentimes difficult, disjointed, and quite time-consuming. Further, unlike automated text mining tools, because the user influences the layout of the annotation graph, the annotation system does not require time-consuming configuration operations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing sense making operations on data sets, the method comprising:
    generating a plurality of nodes associated with a data set and one or more edges that connect pairs of nodes included in the plurality of nodes, wherein the plurality of nodes includes one or more comment nodes, one or more tag nodes, and one or more annotated nodes;
    computing a plurality of pairwise similarities among the plurality of nodes based at least in part on the one or more edges, wherein the plurality of pairwise similarities comprises at least one between-type similarity that is computed between a first pair of nodes of different types and at least one within-type similarity that is computed between a second pair of nodes of a same type, wherein computing the at least one between-type similarity comprises:
        determining that a first edge connects a first node included in the plurality of nodes to a second node that also is included in the plurality of nodes,
        determining that a first type associated with the first node is not equal to a second type associated with the second node, and
        in response to determining that the first type is not equal to the second type, setting a first pairwise similarity between the first node and the second node equal to a between-type similarity constant;
    computing a graph layout based on the plurality of pairwise similarities and one or more user-specified constraints, wherein the one or more user-specified constraints include at least a first graph layout type and a merged set, and wherein the merged set comprises two or more nodes that are specified by a user as a single node; and
    rendering, via a processor, a graph for display based on the graph layout, the plurality of nodes, and the one or more edges.

2. The computer-implemented method of claim 1, wherein the first node included in the plurality of nodes is associated with a first data item included in the data set, the second node included in the plurality of nodes is an annotated node, the first node and the second node are of different types, and the first edge included in the one or more edges connects the first node to the second node.

3. The computer-implemented method of claim 1, wherein the first graph layout type comprises a circular graph and the first node included in the plurality of nodes is associated with a center position within the circular graph.

4. The computer-implemented method of claim 3, wherein computing the graph layout comprises:
setting a position of the first node within the graph equal to the center position;
computing a first position within the graph based on the center position and the first pairwise similarity included in the plurality of pairwise similarities, wherein the first pairwise similarity is associated with the first node and the second node that also is included in the plurality of nodes; and
setting a position of the second node within the graph equal to the first position.

5. The computer-implemented method of claim 1, wherein the first graph layout type comprises a projection graph and the first node included in the plurality of nodes is associated with a first fixed position within the projection graph.

6. The computer-implemented method of claim 5, wherein computing the graph layout comprises, for the second node that also is included in the plurality of nodes:
setting a position of the first node within the graph equal to the first fixed position;
computing an initial position of the second node based on the plurality of pairwise similarities;
adjusting the initial position based on the plurality of pairwise similarities and the first fixed position to generate a first position; and
setting a position of the second node within the graph equal to the first position.

7. The computer-implemented method of claim 1, wherein computing a second pairwise similarity included in the plurality of pairwise similarities comprises:
determining that a third node included in the plurality of nodes is associated with a first data item included in the data set and that a fourth node included in the plurality of nodes is associated with a second data item included in the data set; and
performing one or more weighted aggregation operations on at least one of a row overlap between the first data item and the second data item, a column overlap between the first data item and the second data item, and a time interval overlap between the first data item and the second data item.

8. The computer-implemented method of claim 1, wherein computing a second pairwise similarity included in the plurality of pairwise similarities comprises:
determining that both a third node included in the plurality of nodes and a fourth node that also is included in the plurality of nodes are comment nodes; and
computing a comment-to-comment similarity based on a bag-of-words model, a first set of words associated with the third node, and a second set of words associated with the fourth node.

9. The computer-implemented method of claim 1, wherein the first graph layout type is one of a projection layout type, a slice layout type, and a circular layout type.

10. The computer-implemented method of claim 1, further comprising:
receiving a selection of a data item included in the data set; and
highlighting the data item.

11. One or more non-transitory computer-readable storage media including instructions that, when executed by one or more processors, cause the one or more processors to perform sense making operations on data sets by performing the steps of:
generating a plurality of nodes associated with a data set and one or more edges that connect pairs of nodes included in the plurality of nodes, wherein the plurality of nodes includes one or more comment nodes, one or more tag nodes, and one or more annotated nodes;
computing a plurality of pairwise similarities among the plurality of nodes based at least in part on the one or more edges, wherein the plurality of pairwise similarities comprises at least one between-type similarity that is computed between a first pair of nodes of different types and at least one within-type similarity that is computed between a second pair of nodes of a same type, wherein computing the at least one between-type similarity comprises:
determining that a first edge connects a first node included in the plurality of nodes to a second node that also is included in the plurality of nodes,
determining that a first type associated with the first node is not equal to a second type associated with the second node, and
in response to determining that the first type is not equal to the second type, setting a first pairwise similarity between the first node and the second node equal to a between-type similarity constant;
computing a graph layout based on the plurality of pairwise similarities and one or more user-specified constraints, wherein the one or more user-specified constraints include at least a first graph layout type and a merged set, and wherein the merged set comprises two or more nodes that are specified by a user as a single node; and
rendering a graph for display based on the graph layout, the plurality of nodes, and the one or more edges.

12. The one or more non-transitory computer-readable storage media of claim 11, wherein the first node included in the plurality of nodes is associated with a first data item included in the data set, the second node included in the plurality of nodes is an annotated node, the first node and the second node are of different types, and the first edge included in the one or more edges connects the first node to the second node.

13. The one or more non-transitory computer-readable storage media of claim 11, wherein the first graph layout type comprises a circular graph and the first node included in the plurality of nodes is associated with a center position within the circular graph.

14. The one or more non-transitory computer-readable storage media of claim 13, wherein computing the graph layout comprises:
setting a position of the first node within the graph equal to the center position;
computing a first position within the graph based on the center position and the first pairwise similarity included in the plurality of pairwise similarities, wherein the first pairwise similarity is associated with the first node and the second node that also is included in the plurality of nodes; and
setting a position of the second node within the graph equal to the first position.

15. The one or more non-transitory computer-readable storage media of claim 11, wherein the first graph layout type comprises a projection graph and the first node included in the plurality of nodes is associated with a first fixed position within the projection graph.

16. The one or more non-transitory computer-readable storage media of claim 15, wherein computing the graph layout comprises, for the second node that also is included in the plurality of nodes:
   setting a position of the first node within the graph equal to the first fixed position;
   computing an initial position of the second node based on the plurality of pairwise similarities;
   adjusting the initial position based on the plurality of pairwise similarities and the first fixed position to generate a first position; and
   setting a position of the second node within the graph equal to the first position.

17. The one or more non-transitory computer-readable storage media of claim 11, wherein computing a second pairwise similarity included in the plurality of pairwise similarities comprises:
   determining that both a third node included in the plurality of nodes and a fourth node that also is included in the plurality of nodes are tag nodes;
   computing a co-occurrence among one or more comments based on a first tag that is associated with the third node and a second tag that is associated with the fourth node; and
   performing one or more weighted aggregation operations on the co-occurrence and at least one of a semantic similarity between the first tag and the second tag, and a character similarity between one or more characters included in the first tag and one or more characters included in the second tag.

18. The one or more non-transitory computer-readable storage media of claim 11, further comprising generating a timeline view based on a temporal structure associated with a first data item included in the data set, and rendering the timeline view for display.

19. The one or more non-transitory computer-readable storage media of claim 11, further comprising generating a context view based on a spatial structure associated with the data set, and rendering the context view for display.

20. A system comprising:
   one or more memories storing an annotation subsystem; and
   one or more processors that are coupled to the one or more memories and, when executing the annotation subsystem, are configured to:
      generate a plurality of nodes associated with a data set and one or more edges that connect pairs of nodes included in the plurality of nodes, wherein the plurality of nodes includes one or more comment nodes, one or more tag nodes, and one or more annotated nodes;
      compute a plurality of pairwise similarities among the plurality of nodes based at least in part on the one or more edges, wherein the plurality of pairwise similarities comprises at least one between-type similarity that is computed between a first pair of nodes of different types and at least one within-type similarity that is computed between a second pair of nodes of a same type, wherein computing the at least one between-type similarity comprises:
         determining that a first edge connects a first node included in the plurality of nodes to a second node that also is included in the plurality of nodes,
         determining that a first type associated with the first node is not equal to a second type associated with the second node, and
         in response to determining that the first type is not equal to the second type, setting a first pairwise similarity between the first node and the second node equal to a between-type similarity constant;
      compute a graph layout based on the plurality of pairwise similarities and one or more user-specified constraints, wherein the one or more user-specified constraints include at least a first graph layout type and a merged set, and wherein the merged set comprises two or more nodes that are specified by a user as a single node; and
      render a graph for display based on the graph layout, the plurality of nodes, and the one or more edges.

* * * * *